(12) United States Patent
Callway et al.

(10) Patent No.: US 11,443,715 B2
(45) Date of Patent: Sep. 13, 2022

(54) STROBE CONFIGURATION FOR ILLUMINATION OF FRAME AT DISPLAY DEVICE

(71) Applicant: ATI TECHNOLOGIES ULC, Markham (CA)

(72) Inventors: Ed Callway, Markham (CA); David Glen, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/670,635

(22) Filed: Oct. 31, 2019

(65) Prior Publication Data
US 2020/0219309 A1 Jul. 9, 2020

Related U.S. Application Data

(60) Provisional application No. 62/853,032, filed on May 26, 2019, provisional application No. 62/788,536, filed on Jan. 4, 2019.

(51) Int. Cl.
*G06T 15/50* (2011.01)
*G09G 5/10* (2006.01)
(Continued)

(52) U.S. Cl.
CPC .............. *G09G 5/10* (2013.01); *G06F 3/013* (2013.01); *G06T 15/506* (2013.01); *G09G 3/20* (2013.01); *G09G 3/3208* (2013.01); *G09G 3/3406* (2013.01); *G09G 3/32* (2013.01); *G09G 3/3426* (2013.01); *G09G 3/36* (2013.01); *G09G 2310/0237* (2013.01);
(Continued)

(58) Field of Classification Search
None
See application file for complete search history.

(56) References Cited

U.S. PATENT DOCUMENTS 9,268,160 B2   2/2016   DeCusatis
9,325,978 B2   4/2016   DeCusatis
(Continued)

FOREIGN PATENT DOCUMENTS

CN   1684134 A   10/2005
CN   101563724 A   10/2009
(Continued)

OTHER PUBLICATIONS

U.S. Appl. No. 16/436,876, filed Jun. 10, 2019 listing Koo, Anthony WL. as first inventor, entitled, "Frame Replay for Variable Rate Refresh Display," 42 pages.
(Continued)

*Primary Examiner* — Yanna Wu

(57) ABSTRACT

A display system includes a rendering device and a display device. The rendering device is to render a sequence of frames for display at the display device, wherein the display device is to use an illumination strobe during each frame period associated with a corresponding frame of the sequence of frames. The rendering device further is to determine a position of the illumination strobe within each frame period based one or more input parameters, each input parameter representing a corresponding operational characteristic of one of the rendering device or the display device.

20 Claims, 24 Drawing Sheets

(51) Int. Cl.
*G09G 3/34* (2006.01)
*G09G 3/3208* (2016.01)
*G09G 3/20* (2006.01)
*G06F 3/01* (2006.01)
G09G 3/32 (2016.01)
G09G 3/36 (2006.01)

(52) U.S. Cl.
CPC .............. *G09G 2320/0247* (2013.01); *G09G 2320/0261* (2013.01); *G09G 2320/062* (2013.01); *G09G 2320/0626* (2013.01); *G09G 2320/0646* (2013.01); *G09G 2320/10* (2013.01); *G09G 2330/021* (2013.01); *G09G 2340/16* (2013.01); *G09G 2354/00* (2013.01); *G09G 2360/145* (2013.01)

(56) References Cited

U.S. PATENT DOCUMENTS

| | | | |
|---|---|---|---|
| 9,373,286 | B2 | 6/2016 | Ruckmongathan |
| 2003/0085894 | A1 | 5/2003 | Tatsumi |
| 2005/0259064 | A1 | 11/2005 | Sugino et al. |
| 2006/0050049 | A1 | 3/2006 | Lin et al. |
| 2009/0040374 | A1 | 2/2009 | Kobayashi |
| 2010/0091033 | A1 | 4/2010 | Itoyama et al. |
| 2012/0307161 | A1 | 12/2012 | Ishihara et al. |
| 2015/0109286 | A1 | 4/2015 | Verbeure et al. |
| 2017/0018232 | A1 | 1/2017 | Nicholson |
| 2017/0053620 | A1* | 2/2017 | Law .................... G06T 1/20 |
| 2018/0301097 | A1* | 10/2018 | Yoshida ............... G09G 3/3614 |
| 2019/0163978 | A1* | 5/2019 | Yang .................... G06K 9/6262 |
| 2019/0244572 | A1* | 8/2019 | Le ........................ G09G 3/36 |
| 2019/0318677 | A1 | 10/2019 | Lu et al. |
| 2019/0373882 | A1 | 12/2019 | Zhang |
| 2019/0377923 | A1 | 12/2019 | Chen et al. |
| 2020/0160812 | A1 | 5/2020 | Tovchigrechko et al. |

FOREIGN PATENT DOCUMENTS

| | | |
|---|---|---|
| CN | 101572076 A | 11/2009 |
| CN | 102333200 A | 1/2012 |
| CN | 106356036 A | 1/2017 |

OTHER PUBLICATIONS

U.S. Appl. No. 16/889,318, filed Jun. 1, 2020 listing Lei, Jun as first inventor, entitled, "Display Cycle Control System," 44 pages.
U.S. Appl. No. 16/670,618, filed Oct. 31, 2019 listing Callway, Ed as first inventor, entitled, "Frame-Rate Based Illumination Control at Display Device," 107 pages.
U.S. Appl. No. 16/670,673, filed Oct. 31, 2019 listing Callway, Ed as first inventor, entitled, "Region-by-Region Illumination Control at Display Based on Per-Region Brightness," 109 pages.
U.S. Appl. No. 16/670,651, filed Oct. 31, 2019 listing Callway, Ed as first inventor, entitled, "Region-by-Region Illumination Control at Display Device Based on Per-Region Motion Estimation," 107 pages.
U.S. Appl. No. 16/670,664, filed Oct. 31, 2019 listing Callway, Ed as first inventor, entitled, "Foveated Illumination Control at Display Device," 106 pages.
International Search Report and Written Opinion dated Apr. 20, 2020 for International Application No. PCT/IB2019/061315, 16 pages.
Non-Final Office Action dated Aug. 6, 2020 for U.S. Appl. No. 16/670,651, 29 pages.
Non-Final Office Action dated Jul. 31, 2020 for U.S. Appl. No. 16/670,664, 28 pages.
Non-Final Office Action for U.S. Appl. No. 16/670,673 dated Mar. 30, 2021, 20 pages.
Non-Final Office Action dated Nov. 3, 2020 for U.S. Appl. No. 16/670,618, 27 pages.
Notice of Allowance dated Jan. 27, 2021 for U.S. Appl. No. 16/670,664, 26 pages.
Notice of Allowance dated Apr. 16, 2021 for U.S. Appl. No. 16/670,664, 26 pages.
Baker, Simon, et al., "Motion Blur Reduction Backlights", TFT Central, Mar. 21, 2013, 29 pages.
Day, Michael, et al., "Creating Uniform LED Intensity in RGB Billboard and Video Displays", EE|Times, Oct. 17, 2005, 5 pages.
"Combining Variable Refresh Rate and Strobed Backlight", https://display-corner.epfl.ch/index.php/Combining_variable_refresh_rate_and_strobed_backlight, accessed May 1, 2021, 3 pages.
Notice of Allowance dated Apr. 16, 2021 for U.S. Appl. No. 16/670,664, 10 pages.
Notice of Allowance dated Jun. 11, 2021 for U.S. Appl. No. 16/670,651, 8 pages.
Notice of Allowance dated May 14, 2021 for U.S. Appl. No. 16/670,618, 8 pages.
Final Office Action dated Jul. 26, 2021 for U.S. Appl. No. 16/670,673, 7 pages.
Notice of Allowance dated Apr. 20, 2022 for U.S. Appl. No. 17/464,889, 5 pages.
International Preliminary Report on Patentability dated Jul. 17, 2021 for PCT /IB2019/061315, 9 pages.
Notice of Allowance dated Mar. 8, 2022 for Chinese Application No. 201980088986.3, 6 pages.
Non-Final Office Action dated Feb. 15, 2022 for U.S. Appl. No. 16/670,673, 9 pages.

* cited by examiner

STROBE CONFIGURATION FOR ILLUMINATION OF FRAME AT DISPLAY DEVICE

CROSS-REFERENCE TO RELATED APPLICATIONS

The present application claims priority to the following provisional patent applications, the entireties of which are incorporated by reference herein: U.S. Provisional Patent Application Ser. No. 62/788,536, filed on Jan. 4, 2019 and entitled "Variable Strobe Light Amount Based on Frame Rate or Foveal Area"; and U.S. Provisional Patent Application Ser. No. 62/853,032, filed on May 26, 2019 and entitled "Illumination Control at Display Device".

The present application is related to the following co-pending patent applications, the entirety of which are incorporated by reference herein:

U.S. patent application Ser. No. 16/670,618, entitled "FRAME-RATE BASED ILLUMINATION CONTROL AT DISPLAY DEVICE" and filed on even date herewith;

U.S. patent application Ser. No. 16/670,673, entitled "REGION-BY-REGION ILLUMINATION CONTROL AT DISPLAY DEVICE BASED ON PER-REGION BRIGHTNESS" and filed on even date herewith;

U.S. patent application Ser. No. 16/670,651, entitled "REGION-BY-REGION ILLUMINATION CONTROL AT DISPLAY DEVICE BASED ON PER-REGION MOTION ESTIMATION" and filed on even date herewith; and U.S. patent application Ser. No. 16/670,664, entitled "FOVEATED ILLUMINATION CONTROL AT DISPLAY DEVICE" and filed on even date herewith.

BACKGROUND

Liquid crystal displays (LCDs), light emitting diode (LED) displays, organic LED (OLED) displays, and other emissive, transmissive, and reflective displays conventionally implement one of two illumination configurations: a constant illumination configuration in which the backlight or emissive pixel elements are constantly active at a fixed level for the duration of each frame period; and a strobe configuration in which the backlight or emissive pixel elements are strobed (or "flashed") for only a brief portion of each frame period and otherwise deactivated in the periods proceeding and following the strobe. Displays implementing a constant illumination configuration typically exhibit little if any flicker as the illumination level is constant across each frame period and between each frame period. However, any movement of objects in the displayed content between frames is susceptible to motion blur due to the persistence of vision phenomenon exhibited by the human visual system. Conversely, displays implementing a strobe configuration typically exhibit substantially reduced motion blur due to the brief illumination period during each frame period, but the strobing of the backlight or emissive pixel elements introduces flicker that has the potential to detract from a user's experience. Moreover, the current flows required to provide a sufficiently bright strobe so as to maintain a sufficient average brightness over a series of frame periods typically results in shortened lifespans for the backlight drivers providing such current flows or the emissive pixel elements providing the flashed light.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
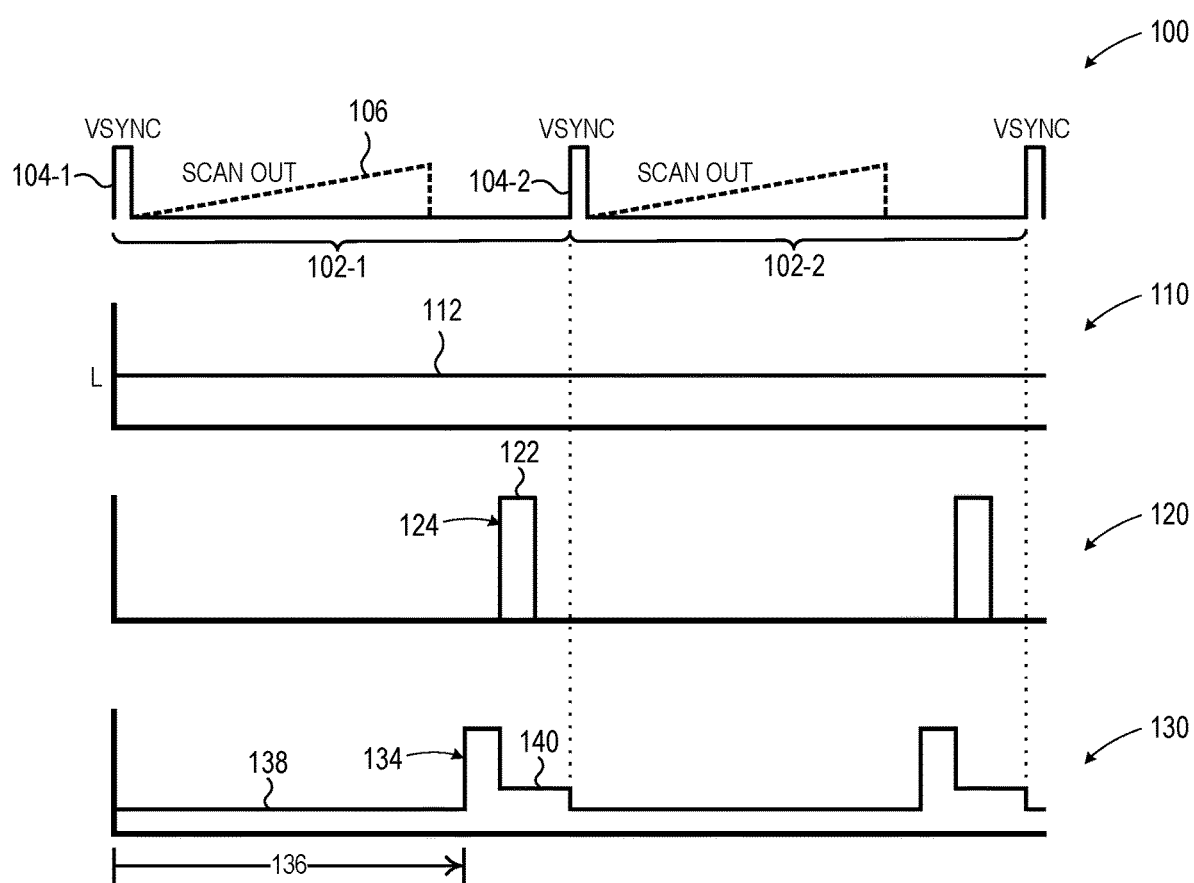
FIG. 1 is a diagram illustrating illumination control during display of frames at a display device in accordance with some embodiments.

In the following description, numerous specific details are set forth to provide a thorough understanding of the systems and techniques presented herein. However, one having ordinary skill in the art should recognize that the various embodiments can be practiced without these specific details. In some instances, well-known structures, components, signals, computer program instructions, and techniques have not been shown in detail to avoid obscuring the approaches described herein. Moreover, it will be appreciated that for simplicity and clarity of illustration, elements shown in the figures have not necessarily been drawn to scale. For example, the dimensions of some of the elements could be exaggerated relative to other elements.

Display devices present video, graphics, and other imagery to a user through the display of sequences of display frames (hereinafter, simply "frames"), with the display of each frame of a sequence being associated with a corresponding frame period, which is the inverse of the frame rate of the corresponding sequence. Each frame is rendered or otherwise generated and the pixel data representing the frame is buffered in a frame buffer or other storage component. As illustrated by timing chart 100 of FIG. 1, at the start of a frame period 102-1 (signaled by, for example, assertion of a vertical sync (VSYNC) 104-1 or a vertical blanking interval (VBI)), the pixel data for the frame to be displayed during the frame period is scanned out of the frame buffer on a row-by-row basis and transmitted to the display device (as represented by scan out line 106), whereupon the display device configures a corresponding row of a pixel matrix composed of, for example, a matrix of liquid crystals (LCs), light emitting diodes (LEDs) or organic LEDs (OLEDs), based on the pixel data of the row of the frame currently being scanned in. The display device causes the "display" of the frame through the emission of display light that is modulated at each pixel in accordance with the pixel data associated with that pixel's location. For liquid crystal displays (LCDs) and other transmissive-type display devices, the emission of display light is achieved through the use of a white backlight and through configuration of each LC at a pixel location based on the pixel data for that pixel location so as to modulate the frequency and intensity of the backlight passing through the LC so that the resulting transmitted light has a corresponding color and intensity. Reflective-type displays operate in a similar manner, but using reflected light rather than backlighting. For LED displays, OLED displays, and other emissive-type display devices, the emission of display light is achieved through activation of the LED or OLED subpixels of different colors (e.g., red, green, and blue) at different intensities so that the combined light emitted by the subpixels combines to provide a particular color and intensity corresponding to the pixel data associated with that pixel.

Whether through emissive, transmissive, or reflection of light, the portion of the frame period during which display light is being generated by the display device so as to display a corresponding frame to a user is referred to herein as the "illumination" of the frame. Some conventional display systems employ a constant illumination approach in which the illumination intensity is maintained at a constant level for the entire duration of the frame period. To illustrate, timing chart 110 of FIG. 1 illustrates a conventional constant illumination technique in which a display device controls the illumination source(s) (e.g., the backlight for an LCD display or the pixels themselves for an LED or LED display) so that the light output 112 is maintained at a constant level L across the entire frame period for each frame period 102-1, 102-2, and so on. This approach typically eliminates display flicker as the illumination level is constant within the frame period and between frame periods, but can instill motion blur for display content in motion between successive frames due to the persistence of vision phenomenon.

Accordingly, to mitigate motion blur, some conventional display systems employ an opposite approach in which illumination occurs for only a brief portion of the frame period, with this brief illumination referred to as an illumination "strobe" (or "flash"). To illustrate, timing chart 120 illustrates a conventional strobed illumination technique in which a display device controls the illumination source(s) so that the light output 122 of the illumination sources is non-zero for only a relatively-small portion of each frame period 102 (that is, no greater than 25%, 20%, 15%, or even 10% of the frame period), and thus effectively forming an illumination strobe 124 that is activated briefly during the frame period 102 (e.g., 0.5 to 2 milliseconds). While this results in the frame being "displayed" as emitted display light for only a relatively short period of time and thus substantially avoiding image persistence and therefore mitigating motion blur, the illumination strobe 124 occurring during each frame period 102 introduces a low-frequency flashing that can be perceived by some users as display flicker. Moreover, to provide an adequate average brightness level, the intensity level of the illumination strobe 124 generally must be set substantially higher than the intensity level needed for the constant illumination approach, and thus results in substantial current outflow by the drivers of the illumination source(s) during the illumination strobe 124. This increased current outflow typically results in a decreased lifespan for the illumination source or requires implementation of heavier-duty driver circuitry, which often is cost prohibitive. Moreover, the timing of the strobe 124 itself can impact the display of the frame, with a strobe occurring earlier in the frame period providing reduced latency but increased potential for ghosting, while a later-occurring strobe can reduce or eliminate ghosting but at the cost of increased latency.

Figure 2:
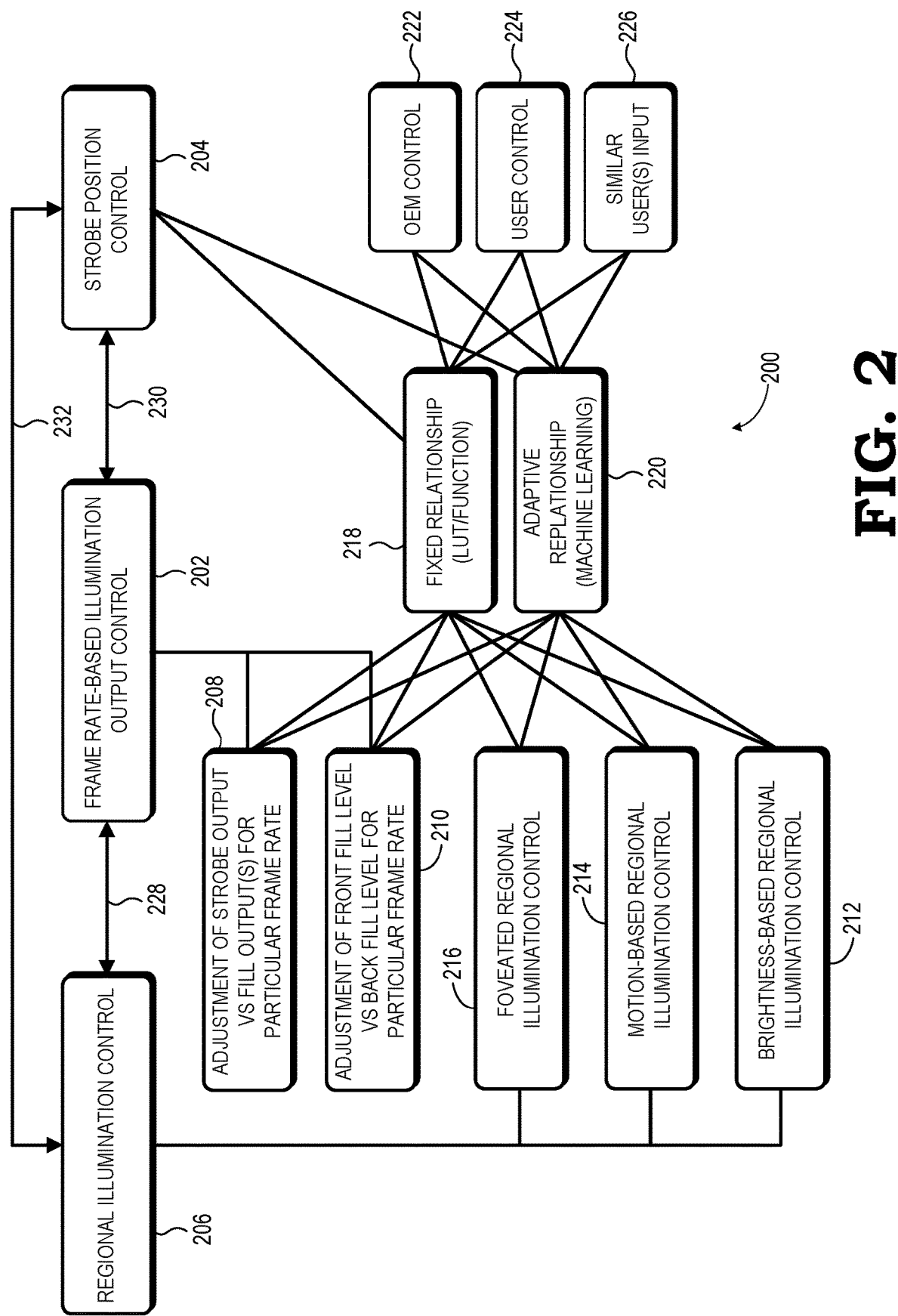
FIG. 2 is a diagram illustrating various illumination control techniques and their combinations in accordance with some embodiments.

To better balance jitter, motion blur, and latency, the present application discloses various techniques for control of the illumination configuration employed by a display device for illuminating a display frame based on one or more parameters, including frame rate, user preferences, original equipment manufacturer (OEM) settings, hardware performance capabilities, current hardware state, image content, user gaze direction, and the like. Referring now to FIG. 2, a taxonomy 200 of these various illumination control techniques, and various combinations thereof, are illustrated with reference to timing chart 130 of FIG. 1. The illumination control techniques described herein can be generally categorized as: techniques for configuring the illumination level(s) and durations implemented within a frame period based on frame rate (hereinafter referred to as "frame rate-based illumination control techniques 202; techniques for configuration the position of an illumination strobe within a frame period (hereinafter referred to as "strobe position control techniques 204"); and techniques for controlling the illumination configuration on a region-by-region basis (hereinafter referred to as "regional illumination control techniques 206").

In at least one embodiment, the backlighting level (for transmissive-type display devices) or the baseline illumination level (for emissive-type display devices) is varied over each frame period during the display of a sequence of frames in accordance with the "illumination configuration" for that frame period. As illustrated by timing chart 130 of FIG. 1, the illumination configuration for a frame period includes, for example, the selective implementation of an illumination strobe 134, selective implementation of a constant illumination level preceding the illumination strobe 134 (referred to herein as "front illumination fill" or simply "front fill"), and selective implementation of a constant illumination level following the illumination strobe 134 (referred to herein as "back illumination fill" or simply "back fill"), or a combination thereof. A front illumination fill 138 "fills" the portion of the frame period 102 preceding the illumination strobe 134 (that is, extends from the start of the frame period 102 to the start of the illumination strobe 134). A back illumination fill 140 "fills" the portion of the frame period following the illumination strobe 134 (that is, extends from the end of the illumination strobe 134 to the end of the frame period 102). Accordingly, in such instances, a frame rate-based illumination control technique 202 is employed to control whether the illumination strobe 134 is implemented for a given frame period, as well as the "output" of one or more of an implemented illumination strobe 134, the front illumination fill 138, and the back illumination fill 140, based at least on the frame rate of the sequence of frames being displayed. As used herein, the "output" of an illumination strobe or illumination fill refers to the product of the illumination level and duration of the corresponding strobe or fill. Such techniques include, but are not limited to, a technique 208 for adjusting the illumination level or duration of strobe 134 relative to one or both of the front illumination fill 138 or the back illumination fill 140 based on frame rate, and a technique 210 for adjusting the front illumination fill 138 and the back illumination fill 140 relative to each other based on frame rate. These techniques are described in greater detail below with reference to FIGS. 9-13.

In the event that an illumination strobe is to be implemented as part of the illumination configuration for a frame period, the position of the illumination strobe (e.g., position 136 of illumination strobe 134 of timing chart 130, FIG. 1) within the corresponding frame period can affect the display of a frame and the user's perception of the displayed frame. Accordingly, one or more strobe position control technique 204 can be implemented to more effectively position an illumination strobe within a frame period based on any of a variety of factors, such as frame rate, user preference, presence of a delayed VSYNC or next frame start, and the like. The strobe position control techniques 204 are described in greater detail below with reference to FIGS. 14 and 15.

Further, in some embodiments the display device employs backlighting or a display matrix that has individually-controllable illumination regions, that is, can be controlled on a region-by-region basis. In such instances, a regional illumination control technique 206 can be employed to control the illumination configuration for each illumination region based on a variety of considerations. For example, a technique 212 for regional illumination control employs per-region brightness measurements or other brightness representations for a frame to be displayed to set a strobe-based illumination configuration for one or more illumination regions for the frame period corresponding to the frame. As another example, a technique 214 for regional illumination control employs motion estimation or other motion analysis to evaluate the motion of objects within each region of a frame associated with a corresponding illumination region of the display device and to set the illumination configuration for each illumination region when the frame is displayed. As yet another example, a technique 216 relies on a gaze tracking subsystem to identify a gaze location on the display matrix to identify which illumination region is a foveal region and which illumination regions are peripheral regions, and then setting the illumination configuration for each illumination region during display of a frame accordingly. Note that reference to "region", "regional", or "regionally", as used herein, in addition to referring to multiple regions, can also refer to a single global region for the entire display device, unless otherwise noted. Moreover, the per-region analysis described herein may be used to control the illumination of a different number of regions—that is, the number of regions analyzed may be greater than, less than, or equal to the number of regions having illumination control as a result of such analysis. These regional illumination control techniques 206 are described in greater detail below with reference to FIGS. 18-26.

The techniques for illumination control described herein typically consider one or more factors, such as frame rate, in determining a corresponding illumination configuration for one or more frame periods. In some embodiments, the relationship between the input factors and the resulting parameters for the illumination configuration is a fixed relationship 218, implemented as, for example, one or more look-up tables (LUTs), as a functional representation or algorithmic representation, and the like. In other embodiments, the relationship between the input factors and the resulting parameters for the illumination configuration is an adaptive relationship 220 that employs machine learning to dynamically adjust the relationship based on a modeling of the behavior of the display system. In still other embodiments, the relationship is a combination of a fixed relationship 218 and an adaptive relationship 220. Whether fixed, adaptive, or a combination thereof, the relationship between input factors and output parameters for an illumination configuration for one or more frame periods can be set based on original equipment manufacturer (OEM) input or control 222, based on user input or control 224, set based on input or control from other users of similar systems, or a combination thereof, as described in greater detail below with reference to FIGS. 16 and 17.

As represented by lines 228, 230, and 232, control of the illumination configuration for a frame period is not limited to employment of only one technique or only techniques of the same type. To illustrate, in some embodiments one or more frame rate-based illumination control techniques 202 are employed individually or in combination with one or more regional illumination control techniques 206, in combination with one or more strobe position control techniques 204, or in combination with both one or more regional illumination control techniques 206 and one or more strobe position control techniques 204. Similarly, in some embodiments one or more strobe position control techniques 204 are employed individually or in combination with one or more regional illumination control techniques 206, or one or more regional illumination control techniques 206 are employed together.

Note that for ease of illustration, some of the illumination control techniques are described herein as involving the determination of an illumination configuration based on one or more aspects of a frame to be displayed and then implementing that illumination configuration for the frame period in which that same frame is to be displayed. However, it will be appreciated that due to the processing effort involved in determining an illumination configuration from one or more of such frames, the illumination configuration often will not be ready for implementation for display of the same frame(s) on which it was based. In such cases, the illumination configuration instead is employed for one or more subsequent frames, and the illumination configuration(s) determined from these subsequent frames are employed for one or more still further subsequent frames and so forth. As such, reference to application of an illumination configuration for display of the same frame from which the illumination configuration was determined should also be understood to similarly describe application of an illumination configuration for display of a subsequent frame, unless otherwise noted.

Figure 3:
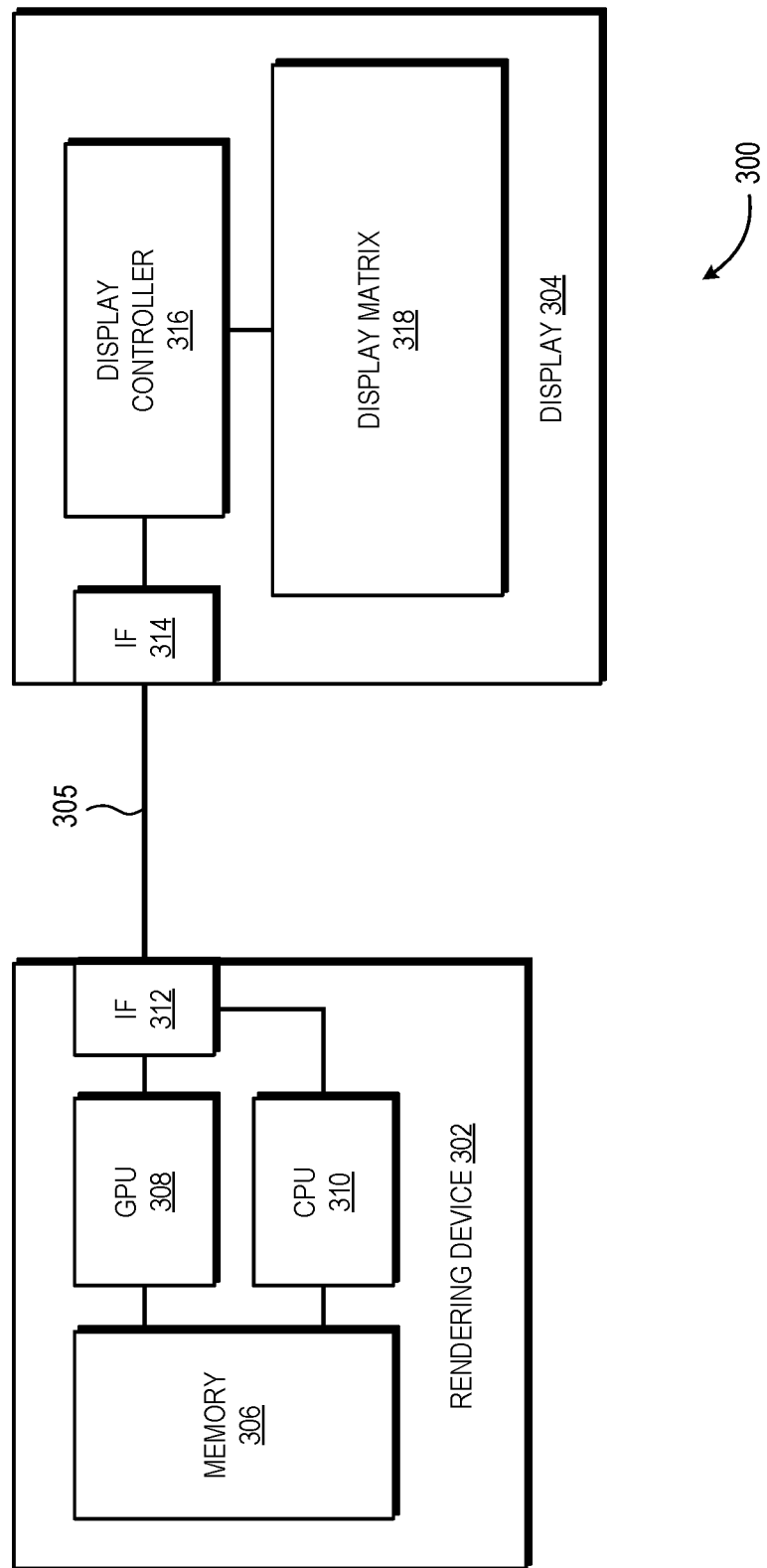
FIG. 3 is a block diagram illustrating a display system employing one or more illumination control techniques in accordance with some embodiments.

FIG. 3 illustrates an example display system 300 for implementing one or more of the illumination configuration control techniques described herein in accordance with some embodiments. The display system 300 includes a rendering device 302 and a display device 304 connected by a wired or wireless interconnect 305. The rendering device 302 includes any of a variety of devices used to generate video content, including a notebook computer, a desktop computer, a server, a game console, a compute-enabled smartphone, and the like. The display device 304 includes a digital display device to display video content, such as a digital television, computer monitor, portable device display, and the like. Note that the rendering device 302 and the display device 304, in some implementations, are implemented in the same device, such as in the case of a tablet computer, notebook computer, compute-enabled phone, and the like. The rendering device 302 includes at least one memory 306, at least one processor, such as a GPU 308 and a central processing unit (CPU) 310, and a display interface (IF) 312. The display device 304 includes a display interface 314, a display controller 316, and a display matrix 318. The display interfaces 312, 314 include wired or wireless interconnect interfaces, such as HDMI interfaces, DisplayPort interfaces, embedded DisplayPort (eDP) interfaces, and the like. The display controller 316 is implemented as one or more processors to execute software instructions stored in memory (not shown), one or more programmable logic components, one or more hardcoded logic components, or a combination thereof. The display matrix 318 includes a two-dimensional array of pixels used to display a sequence of display images, and includes, for example, a light emitting diode (LED) matrix, an organic LED (OLED) matrix, a liquid crystal (LC) matrix, a matrix of movable mirrors for a digital light processing (DLP) display, or the like.

As a general operational overview, the memory 306 stores one or more sets of executable software instructions to manipulate the CPU 310 and GPU 308 to render a video stream including a series of display frames and corresponding metadata and to transmit this video stream to the display device 304 via the display interfaces 312, 314 and the interconnect 305. At the display device 304, the display controller 316 receives each display frame and corresponding metadata in turn, and processes the display frame for display in sequence at the display matrix 318 during a corresponding frame period.

Figure 4:
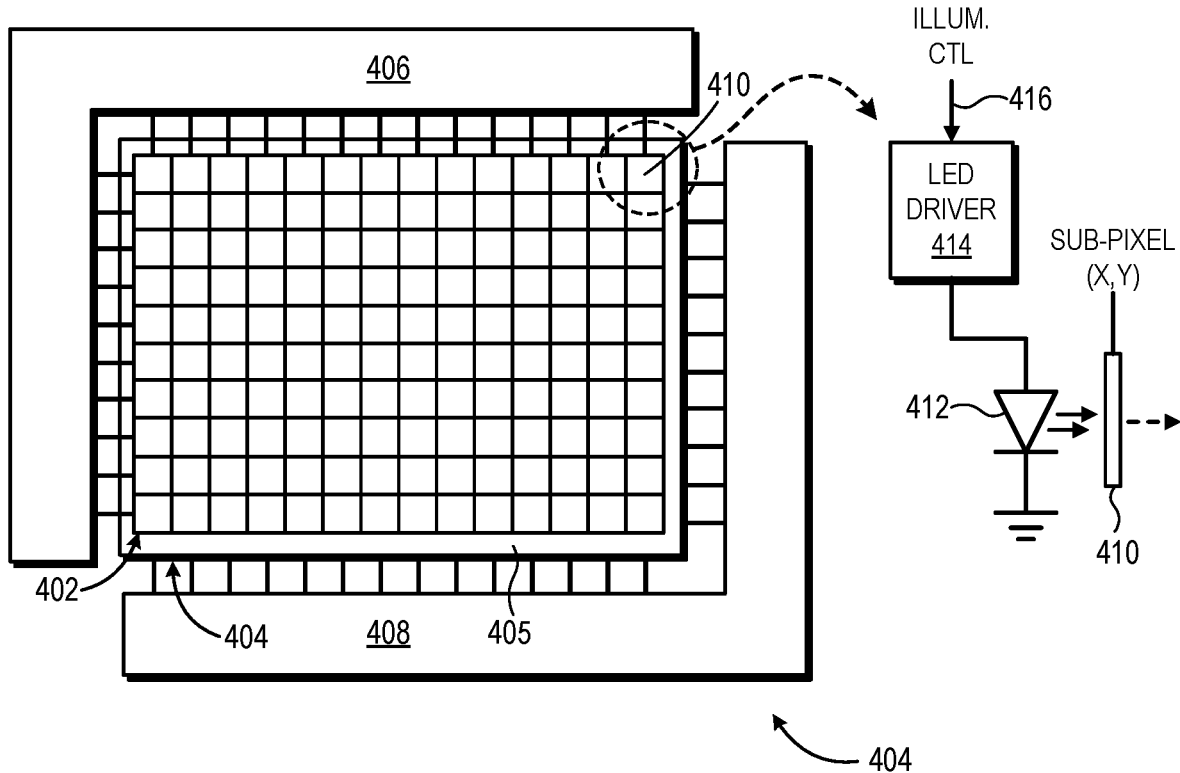
FIG. 4 is a block diagram illustrating an example transmissive-type display device in accordance with some embodiments.

The display device 304 is implemented as, for example, an emissive-type display, a transmissive-type display, a reflective-type display, or a hybrid thereof. As illustrated by FIG. 4, a transmissive-type display device 404 (one embodiment of the display device 304) implements the display matrix 318 as an LC matrix 402 and a backlight 405 and the display controller 316 is implemented as an LC controller 406 and a backlight controller 408. The LC matrix 402 implements an array of LC pixels 410, with each LC pixel 410 composed of one or more LC subpixels representing a corresponding color (e.g., red, green, and blue) of the pixel. In operation, each row of pixel data of a frame is fed sequentially to the LC controller 406, which selectively activates the LC pixels 410 at the corresponding row based on the pixel value for the corresponding pixel in that row (e.g., pixel(X,Y) being the pixel value for the frame at column X and row Y). The backlight 405 is composed of an array or other set of LEDs that are selectively activated to emit light which is then polarized and selectively transmitted through each LC pixel 410 of the LC matrix 402 based on the corresponding pixel value used to selectively activate the LC pixel 410.

Thus, to "display" the frame, the backlight controller 408 uses one or more LED drivers 414 to drive the LEDs 412, where the amount of current, voltage, or pulse shape (collectively, "power") driven by the LED drivers 414, and thus the illumination intensity of the light emitted by the LEDs 412, is controlled during each frame period via an illumination control (CTL) signal 416 controlled by the backlighting controller 408. As such, as the level or value of the illumination CTL signal 416 varies over a frame period, the backlighting emitted by the LEDs 412 varies accordingly. As such, the illumination configuration for a frame period is implemented in the transmissive-type display device 404 through configuration of the level or value of the illumination CTL signal 416 by the backlighting controller 408. That is, the backlighting controller 408 implements any front illumination fill, illumination strobe, and back illumination fill for a frame period through corresponding control of the illumination CTL signal 416.

Figure 5:
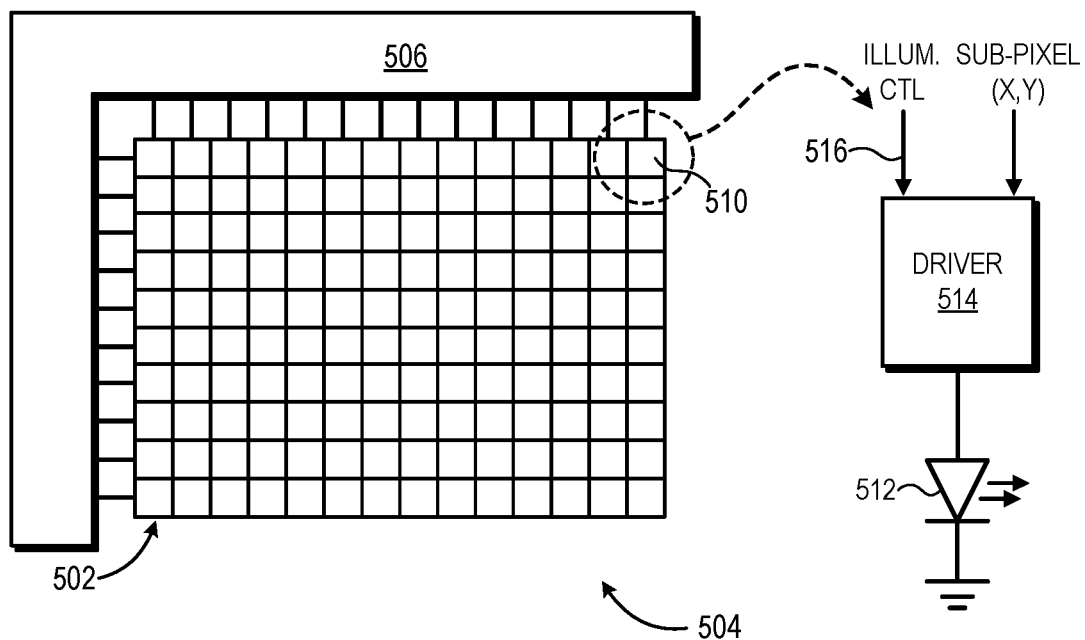
FIG. 5 is a block diagram illustrating an example emissive-type display device in accordance with some embodiments.

Turning to FIG. 5, an emissive-type display device 504 (one embodiment of the display device 304) implements the display matrix 318 as an LED matrix 502 and the display controller 316 is implemented as an LED controller 506. The LED matrix 502 implements an array of pixels 510, with each pixel 510 composed of one or more subpixels 512, each representing a corresponding color (e.g., red, green, and blue) of the pixel. Each subpixel is implemented as an LED or an OLED. In operation, each row of pixel data of a frame is fed sequentially to the LED controller 506, which selectively activates the subpixels 512 of the pixels 510 at the corresponding row based on the pixel value for the corresponding pixel in that row. Thus, to "display" the frame at the display device 504, each subpixel 512 is driven by a corresponding driver 514, where the power provided by the driver 514 to the subpixel 512, and thus the illumination intensity of the light emitted by the subpixel 512, is controlled by the combination of the associated subpixel value of the pixel represented by the subpixel 512 and the current illumination level of the illumination configuration for the frame period as represented by an illumination CTL signal 516. In some embodiments, the subpixel value and the value of the illumination CTL signal 516 are multiplied to generate a resulting value that controls the magnitude of current, voltage, or pulse shape supplied by the driver 514. As such, the illumination CTL signal 516, representing the current illumination configuration value at the corresponding point in time in the frame period, acts to scale the illumination intensity of each subpixel up or down. For example, if the illumination CTL signal 516 is represented as an eight-bit value, then the illumination intensity of the subpixels 512 of the LED matrix 502 can be scaled up or down over 256 steps. Accordingly, the display device 504 implements any front illumination fill, illumination strobe, and back illumination fill for a frame period through corresponding control of the illumination CTL signal 516.

Figure 6:
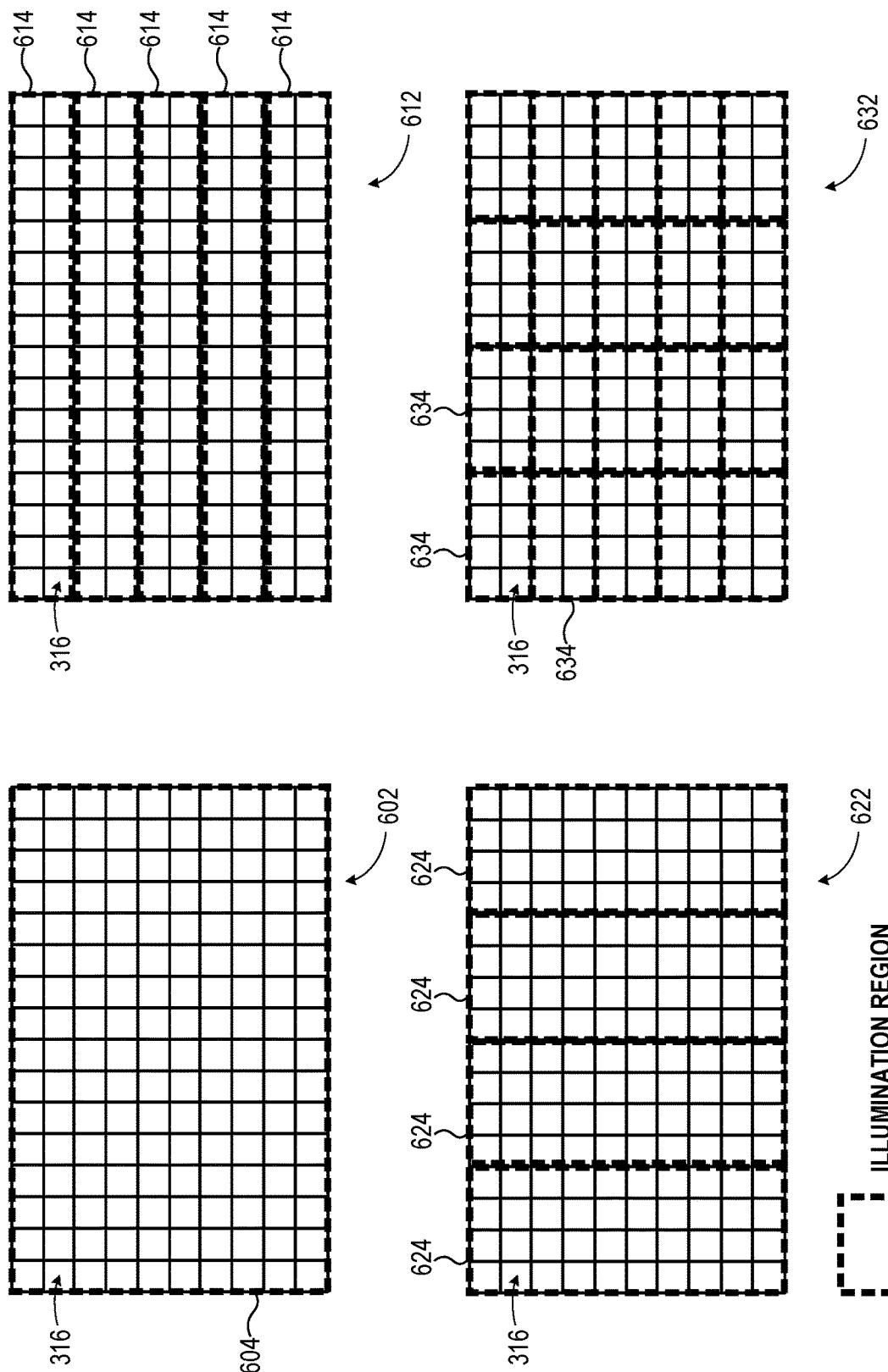
FIG. 6 is a block diagram illustrating various example display device configurations for regional illumination control in accordance with some embodiments.

Although FIGS. 4 and 5 illustrate embodiments of the display device 304 in which the illumination intensity is globally scaled up or down during a frame period in accordance with the same illumination configuration for all pixels of the frame, in other embodiments the display device 304 implements a regional illumination approach in which the display matrix 318 is partitioned into a plurality of individually-controllable illumination regions. That is, each illumination region is separately controllable so as to implement a region-specific illumination configuration during a frame period. As illustrated by FIG. 6, this partitioning is implemented in any of a variety of ways. Global partitioning 602 illustrates a configuration in which there is no partitioning; that is, the entire display matrix 318 is a single, or global, illumination region 604. Row partitioning 612 illustrates a configuration of the display device 304 in which the display matrix 318 is partitioned by row such that each subset of one or more rows of the display matrix 318 is organized as a separate illumination region 614. Conversely, column partitioning 622 illustrates a configuration of the display device 304 in which the display matrix 318 is partitioned by column such that each subset of one or more columns of the display matrix 318 is organized as a separate illumination region 624. Grid partitioning 632 illustrates a configuration of the display device 304 in which the display matrix 318 is partitioned by row and by column such that the pixels are partitioned into a plurality of illumination regions 634, each region including pixels from one or more rows and one or more columns. Other partitioning schemes can be employed to divide the display matrix 318 into illumination regions that can be separately controlled for illumination intensity purposes.

Figure 7:
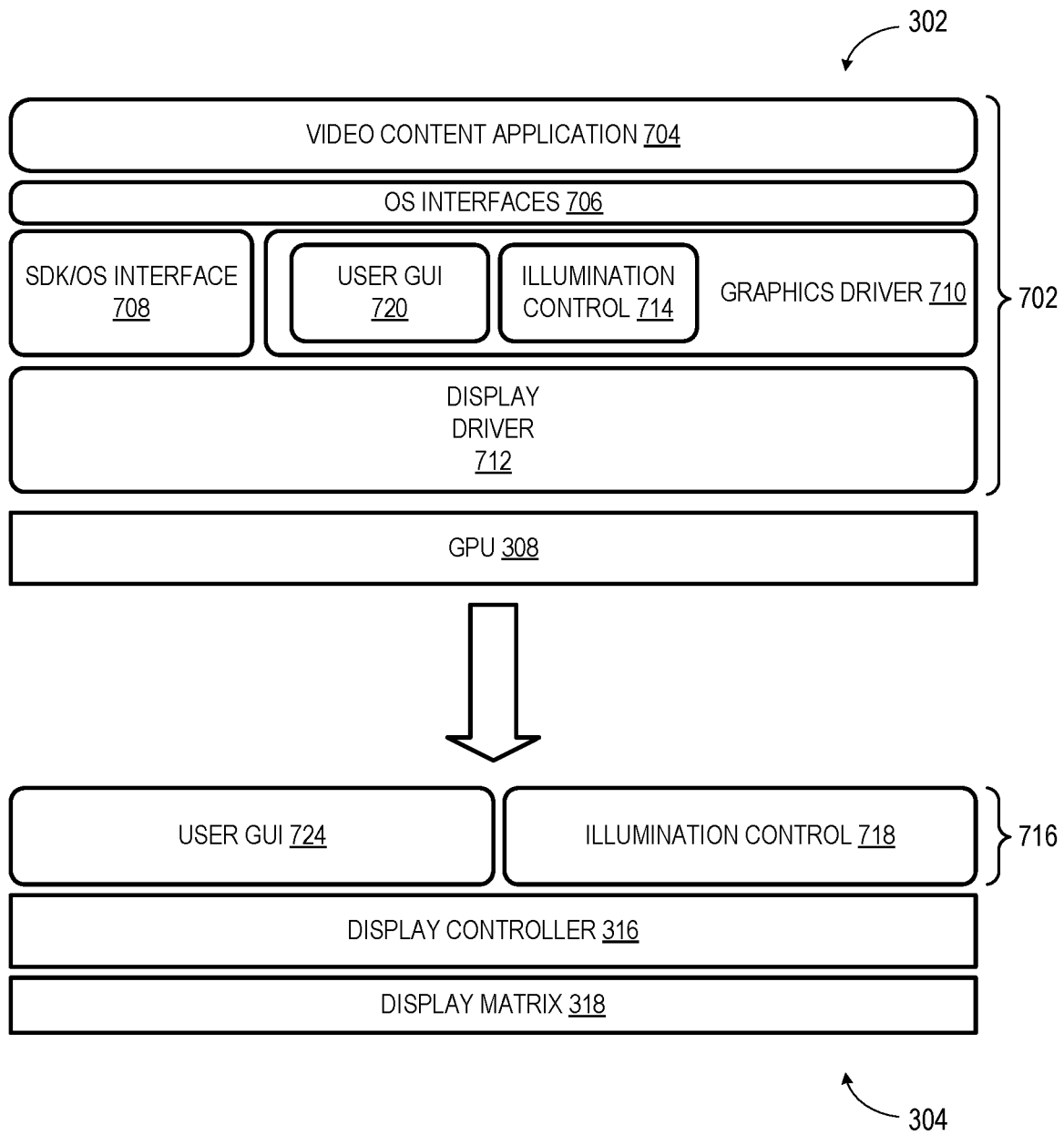
FIG. 7 is a block diagram illustrating a software/hardware stack implemented by the display system of FIG. 3 in accordance with some embodiments.

FIG. 7 illustrates the software stacks implemented at the rendering device 302 and the display device 304 to facilitate implementation of one or more illumination configuration control techniques in accordance with some embodiments. Software stack 702 is implemented in the rendering device 302, and includes one or more video content applications 704, one or more operating system (OS) interfaces 706, a software developer kit (SDK)/OS interface 708, a graphics driver 710, and a display driver 712. The video content application 704 includes a software application that sources the video content to be rendered, such as a gaming application, a virtual reality (VR) or augmented reality (AR) application, a video playback application, and the like. Drawing instructions for a display image of this video content are provided to the graphics driver 710 via the OS interface 706, whereupon the graphics driver 710 coordinates with the GPU 308 to render the corresponding display frame, which is buffered in a frame buffer or other storage component of the rendering device 302. The display driver 712 then operates to transmit the pixel data representative of the buffered frame on a row-by-row basis, along with associated metadata, to the display device 304 via the interconnect 305.

In some embodiments, control of the illumination configuration for one or more frame periods is primarily implemented by the rendering device 302. In such embodiments, the software stack 702 includes a source-side illumination control module 714 to implement one or more of the illumination configuration control techniques described herein. In the example of FIG. 7, the source-side illumination control module 714 is shown as part of the graphics driver 710, but in other embodiments is implemented elsewhere in the software stack 702. In these embodiments, the source-side illumination control module 714 determines an illumination configuration to implement for a corresponding set of one or more frames and transmits a representation of this illumination configuration to the display device 304 via, for example, a sideband transmission or as part of the metadata accompanying the pixel data of the frame. A display-side illumination control module 716 of a software stack 716 of the display device 304 receives this transmitted representation of the illumination configuration and then configures the display controller 316 to implement the illumination level(s) and segment durations represented by the illumination configuration during the corresponding frame period. In other embodiments, control of the illumination configuration for frame periods is primarily implemented at the display device 304 itself, in which case the display-side illumination control module 716 determines and implements an illumination configuration directly at the display device based on the frame data being received from the rendering device 302.

Further, in some implementations, control of the illumination configuration can be controlled or modified through user input. In some embodiments, this user input is received at the rendering device 302, and thus the software stack 702 includes a graphical user interface (GUI) 720 or other user interface to receive user input pertaining to illumination configuration and implement the user input accordingly. The GUI 720 can be implemented, for example, as part of the graphics driver 710 or, alternatively, as part of the video content application 704 or other software module of the software stack 702. In other embodiments in which the display device 304 controls the setting of the illumination configuration, user input is received and implemented at a GUI 724 of the software stack 716 of the display device 304.

Figure 8:
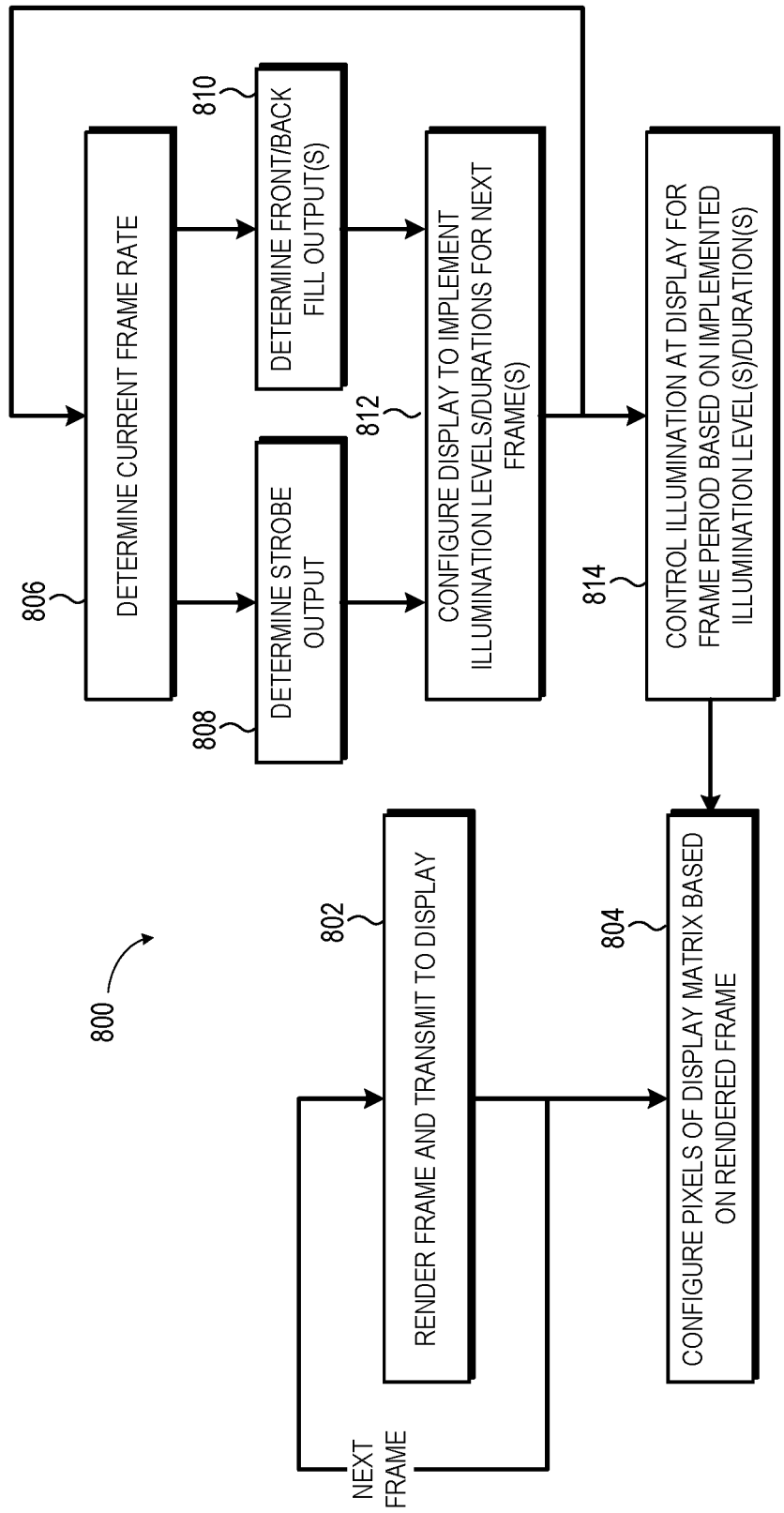
FIG. 8 is a flow diagram illustrating a method for frame rate-based illumination control of a display device in accordance with some embodiments.

FIG. 8 illustrates a method 800 representing the general process employed by the frame rate-based illumination output control techniques 202 (FIG. 2) in accordance with some embodiments. For ease of illustration, method 800 is described in an implementation context in which the source-side illumination control module 714 (FIG. 7) is responsible for determining the illumination configuration settings to be implemented. However, the process described below can be adapted for implementation by the display-side illumination control module 718 using the guidelines provided herein.

At block 802, the GPU 308 renders or otherwise generates a frame in a sequence of frames at the direction of the video content application 704 and buffers the generated frame in a frame buffer or other storage component at the rendering device 302. The display driver 712 then transmits the buffered pixel data and metadata representative of the generated frame on a row-by-row basis to the display device 304 via the interconnect 305. At block 804, for each row of pixel data received for the frame being transmitted, the display controller 316 configures each row of pixels of the display matrix 318 to represent the corresponding pixel values of the received row of pixel data so that when illumination of the frame at the display device 304 occurs during the associated frame period, display light representative of the frame is emitted by the display matrix 318, either directly via LED, OLED, plasma, or other emissive pixel configurations, via selective backlight transmission by LC or other transmissive pixel configurations, or via selective light reflection by digital light processing (DLP) or other reflective pixel configurations.

In parallel with the rendering, transmission, and pre-display matrix configuration process of blocks 802 and 804, the source-side illumination control module 714 determines the parameters of the illumination configuration to be used for displaying the subject frame. This sub-process begins at block 806 with the illumination control module 714 determining the current frame rate of the sequence of frames being generated. In some embodiments, the frame rate is fixed and represented by some control setting that is accessed or referenced by the illumination control module 714. In other embodiments, the display system 300 employs a variable frame rate, in which case the illumination control module 714 monitors the frame periods of one or more preceding displayed frames (as specified by a software-based or physical VSYNC signal or a "frame completed" signal) to estimate the current frame rate, or receives from the GPU 308 an indication of the current frame rate being implemented by the GPU 308. From this, the illumination control module 714 estimates the duration of the next frame period via, for example, linear extrapolation, a polynomial best fit analysis, Kalman filtering, a machine learning process, and the like.

Based on the current frame rate, at block 808 the illumination control module 714 determines whether the illumination configuration for displaying the frame is to include an illumination strobe, and if so, at least one of the illumination level or duration to be used for the illumination strobe. Concurrently, at block 810 the illumination control module 714 determines what illumination level(s) are to be implemented for the front illumination fill and back illumination fill for the illumination configuration. The processes of blocks 808 and 810 is described in greater detail below with reference to FIGS. 9-13.

With the illumination configuration determined, the illumination control module 714 transmits a representation of the illumination configuration to the display device 304. This representation of the illumination level(s), durations, and positions of the illumination configuration can be implemented in any of a variety of formats and transmitted to the display device 304 in any of a variety of ways, including as metadata or sideband data. To illustrate, assuming the display device 304 is configurable to provide an illumination configuration having a non-zero front illumination fill, an illumination strobe, and a non-zero back illumination fill with fixed segment positions and durations, the illumination configuration can be represented as a control data structure having three values, with a first value representing the illumination level for the illumination strobe, a second value representing the illumination level for the front illumination fill, and a third value representing the illumination level for the back illumination fill. In other embodiments with variable position and duration of the illumination strobe, the widths of at least two of the segments is transmitted, and thus allowing derivation of the width and position of the third segment in instances where the frame period is fixed or known. In other embodiments, the display controller 316 includes a pre-populated table configured with different combinations of front illumination fill levels, back illumination fill levels, and strobe illumination levels, and the representation of the determined illumination configuration can include transmission of an index value representing a corresponding entry of the table at the display controller 316.

In response to receiving the representation of the determined illumination configuration, at block 814 the display-side illumination control module 718 configures the display controller 316 to control the illumination level of the display matrix 318 over the course of the corresponding frame period so that the frame is illuminated by the display matrix 318 and the resulting display light projected to the user. For a transmissive-type display device (e.g., display device 404, FIG. 4), control of the illumination level of the display matrix 318 over the corresponding frame period is achieved by controlling the illumination intensity, or light output, of the backlight 405 to reflect the illumination level of the illumination configuration at the corresponding point in time within the frame period. Reflective-type display devices are controlled in a similar manner by controlling the illumination level of the reflected light source. For emissive-type display devices (e.g., display device 504, FIG. 5), control of the illumination level of the display matrix 318 over the corresponding frame period is achieved by scaling each subpixel value based on an illumination control value that represents the illumination level of the illumination configuration at the corresponding point in time within the frame period so that the current, voltage, pulse shape, or other power driving the LED, OLED, or other emissive pixel scales with the illumination level within the illumination configuration. That is, the power used to drive the emissive pixel is, in effect, representative of a product of the subpixel value for that emissive pixel and a value representing the current illumination level in the illumination configuration at that point in time in the frame period.

The flow of method 800 then returns to block 802 for the generation, buffering, transmission, and pre-display configuration of the next frame. In some embodiments, the same illumination configuration is employed for each frame generated within a sequence of two or more frames (e.g., the sequence representing the frames generated between scene changes or the frames between two frames having substantially different brightness levels than their preceding frame), in which case the sub-process of blocks 806, 808, 810, and 812 is only performed once per sequence of frames. In other embodiments, an illumination configuration is separately determined for each frame to be displayed, in which case the sub-process of blocks 806, 810, and 812 is performed anew for each generated frame.

Figure 9:
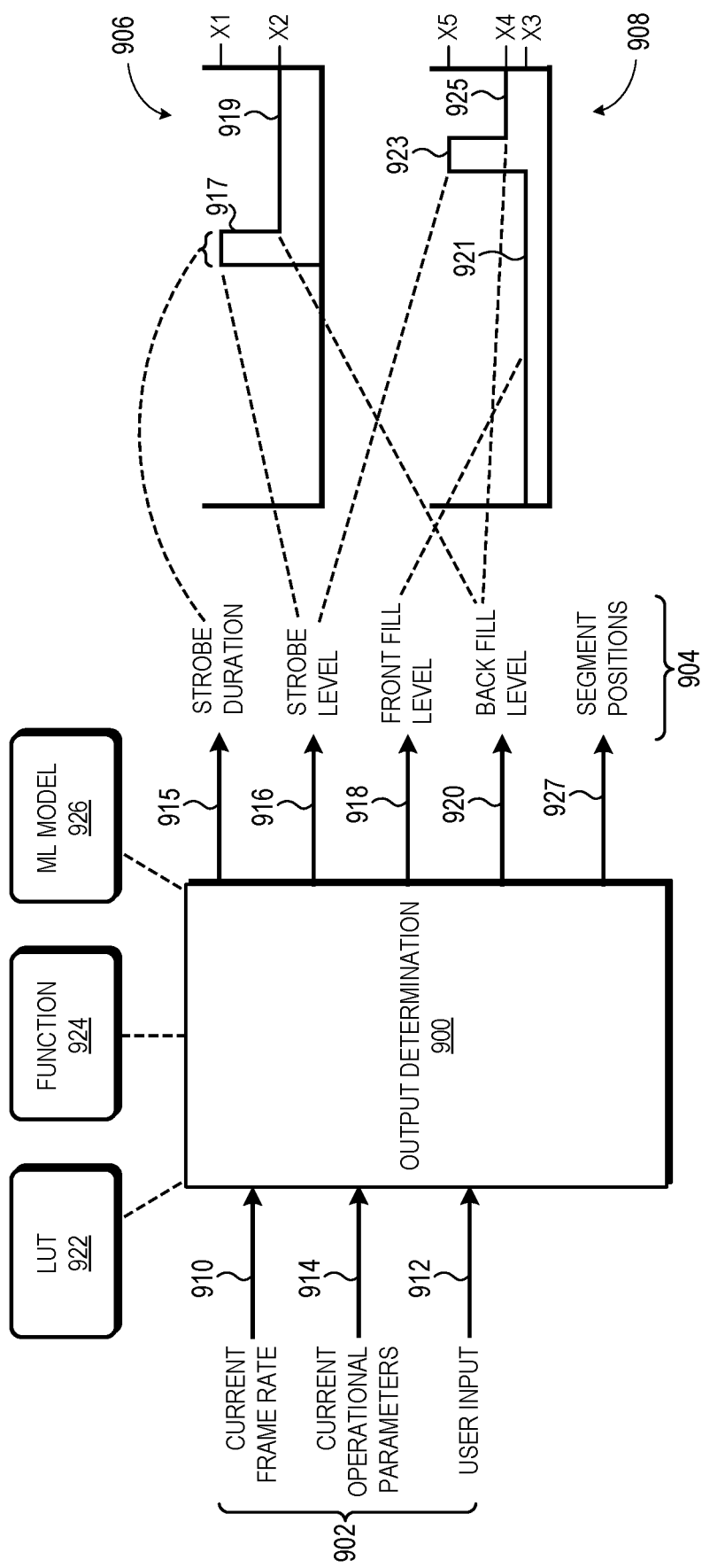
FIG. 9 is a diagram illustrating a technique for determining strobe and fill illumination outputs based on frame rate in accordance with some embodiments.

Turning now to FIG. 9, an example technique for implementing the illumination output determination processes of blocks 808 and 810 of method 800 is illustrated. In one embodiment, the illumination control module 714 implements a output determination module 900 to obtain various input parameters 902, and from these input parameters 902, generate a representation 904 of the illumination configuration (e.g., illumination configuration 906 or illumination configuration 908) to be implemented for the illumination of a frame at the display device 304.

The frequency at which successive frames are displayed, that is, the frame rate, typically is a primary factor in the manifestation of various display artifacts perceived by a user. At lower frame rates (e.g., at or below 60 frames-per-second (FPS)), most users are likely to perceive flicker caused by illumination strobes or other variations in the average illumination level between frames. At higher frame rates (e.g., at or above 100 FPS), the flicker is likely to become imperceptible, but the timing of an illumination strobe potentially will result in ghosting or tearing due to the row-by-row scan out and settling time of pixels of the display device. Further, higher frame rates can result in motion blur when constant illumination levels are used due to persistence of vision exhibited by most users. Accordingly, in at least one embodiment, the current frame rate (signal 910) is employed as one of the input parameters 902 considered by the output determination module 900 in determining the illumination output(s) (that is, at least one of illumination level and duration) of the illumination configuration at issue.

User input (signal 912) also can be employed by the output determination module 900. To illustrate, the user may be less bothered by flicker, and thus provide user input indicating a lower threshold for employing an illumination strobe than would otherwise be set by the output determination module 900. Conversely, another user may be more sensitive to flicker, and thus provide user input that sets a higher threshold for employing an illumination strobe. The use of user input as a factor in setting an illumination configuration is described in greater detail below with reference to FIG. 16.

The output determination module 900, in one embodiment, also utilizes one or more current operational parameters (signal 914) of the display system 300 as input parameters 902 for determining the appropriate illumination levels of a resulting illumination configuration. Such current operational parameters include, for example, a level of ambient light (which in turn is suggestive of a target average brightness of the display device), a current temperature of the drivers for the backlight 405 or the LED matrix 502 (which is indicative of whether the drivers are at risk of being overloaded), a current operational state of the GPU 308 (which indicate, for example, whether the next frame period is to be delayed due to the GPU 308 being unable to render the corresponding frame in time), and the like.

In at least one embodiment, an illumination configuration is represented by at least three parameters: a strobe level value 916 representing an illumination level to employ for an illumination strobe (if activated) in the frame period, a front fill level value 918 representing an illumination level to employ for a front illumination fill preceding the illumination strobe, and a back fill level value 920 representing an illumination level to employ for a rear illumination fill following the illumination strobe. To illustrate, illumination configuration 906, having no front illumination fill, an illumination strobe at illumination level X1 and a back illumination fill at illumination X2 could be represented by the tuple <0, X1, X2>, whereas illumination configuration 908, having a front illumination fill 921 at illumination level X3, an illumination strobe 923 at illumination level X5, and a back illumination fill 925 at illumination level X4 can be represented by the tuple <X3, X5, X4>.

As described below, the position of the illumination strobe can be adjusted, and thus the illumination configuration further can include one or more segment position parameters 927 that specify the position of one or more of the illumination strobe, the front illumination fill, and the back illumination fill within the frame period. The "position" of a corresponding segment is represented, for example, as a start time following start of the frame period and a width or other representation of duration of the segment. If the frame period is constant, then specification of the positions of any two of the illumination strobe, front illumination fill, and back illumination fill allows the position of the remaining unspecified segment to be calculated. In the event that an illumination strobe is not implemented in the illumination configuration, the strobe level value 916 is set to zero, or alternatively, is set to the same value as either the front fill level value 918 or the back fill level value 918, thereby in effect extending the duration of the corresponding illumination fill. In other embodiments, the illumination level of an illumination strobe, if activated, is fixed or set, in which the representation 904 omits the strobe level value 916, or includes, for example, a binary value to identify whether to include an illumination strobe in the illumination configuration. In other embodiments, the strobe duration also is adjustable based on frame rate or other input parameters 902, in which case the representation 904 would also include a strobe duration value 915 representing the width or other duration representation of the illumination strobe (it will be appreciated that the strobe duration value 915 serves as a particular segment position parameter 927).

The values 916, 918, and 920 are presentable in any of a variety of formats. In some embodiments, each value is an absolute value set between the minimum and maximum thresholds for the corresponding illumination level. For example, each value 916, 918, and 920 can be implemented as an eight-bit value, and thereby providing 256 illumination level steps each. In other embodiments, some or all of the values 916, 918, and 920 are relative values. For example, the values 918 and 920 can represent some percentage of the illumination value represented by the strobe level value 916.

The output determination module 900, in one embodiment, identifies the illumination level(s) to be employed, the strobe duration to be employed (in implementations with variable strobe durations), and the positions/durations of the strobe and front and back fills in an illumination configuration based on the input parameters 902 using any of a variety of mechanisms or combinations thereof. In some embodiments, the output determination module 900 maintains one or more LUTs 922 or other tables that represent the relationship between a value for one or more input parameters 902 and the corresponding illumination level(s), strobe duration, and segment position(s) to be implemented in the illumination configuration. To illustrate using a simple example based on frame rate and in which the duration or positions of the segments are fixed, the LUT 922 could be configured as shown in Table 1:

TABLE 1

| example LUT implementation | | | |
|---|---|---|---|
| FPS | Strobe level | Front fill level | Back fill level |
| <60 | 30 | 30 | 30 |
| 60-100 | 50 | 20 | 20 |
| >100 | 70 | 0 | 40 |

Thus, a frame rate of below 60 FPS results in a constant illumination configuration (that is, the illumination level is constant over the entire frame period), a frame rate of 75 FPS would result in implementation of an illumination strobe at an illumination level of 50, a front illumination fill at an illumination level of 20, and a back illumination fill at an illumination level of 20, and a frame rate of 120 FPS would result in implementation of an illumination strobe at an illumination level of 70, a back illumination fill at an illumination level of 40, and no front illumination fill (that is to say, a front illumination fill at an illumination level of 0).

In other embodiments, the relationship between input parameter(s) 902 and illumination level(s) and segment positions of an illumination configuration is provided by one or more functions 924 or other functional algorithms implemented in software code. For example, the example relationship of the strobe level value 916 and FPS in Table 1 could instead be represented as a function 924 in the format of:

$$\text{Strobe\_level} = \begin{cases} 30, & FPS < 60 \\ 50, & 60 \leq FPS \leq 100 \\ 70, & FPS > 100 \end{cases}$$

In still other embodiments, the relationship between input parameter(s) 902 and illumination level(s)/positions/durations of an illumination configuration is provided using a learned model 926 developed using a neural network or other machine learning (ML) technique. To illustrate, in some embodiments, the user is presented with test video displayed using different illumination configurations and the user's feedback on the performance of each test video used as a training set for initial training of the learned model 926. Thereafter, the learned model can be further refined based on user input that adjusts various illumination configuration parameters to better suit the user's particular preferences, based on observations of correlations between frame rates or other various operational parameters and the effectiveness of the display of frames using the resulting illumination configurations, and the like.

The relationship between one or more operational parameters 902 and corresponding illumination level(s), durations, and positions of the illumination configuration are configured in any of a number of manners. In some embodiments, the relationship is predefined by an OEM or supplier of the graphics driver 710 or the GPU 308, and thus can be periodically updated using firmware or software updates. For example, a graphics driver update release can include updated values for the LUT 922. Further, in some embodiments, user input is used to originally create the representation of the relationship, or to adjust previously-determined values. For example, using the GUI 720 (FIGS. 7 and 16), the user can set the FPS thresholds used to change illumination level(s), to activate or deactivate use of an illumination strobe, to change the illumination level(s) themselves, and the like. Still further, as mentioned above, the relationship can be a dynamic relationship as represented by, for example, a learned model that is continuously updated based on various training inputs.

Figure 10:
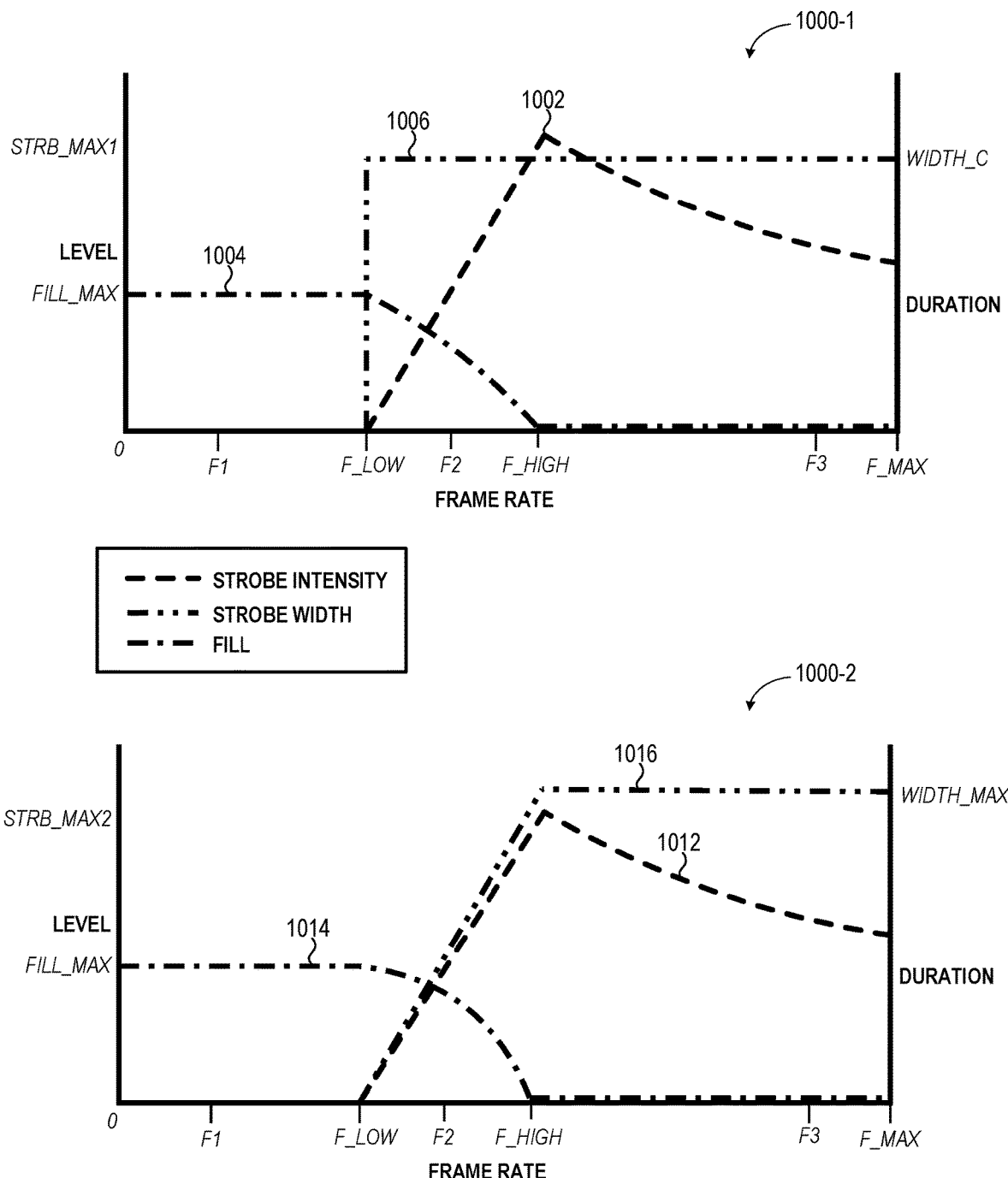
FIG. 10 is a diagram illustrating example relationships between strobe and after-strobe fill illumination outputs based on frame rate in accordance with some embodiments.
Figure 11:
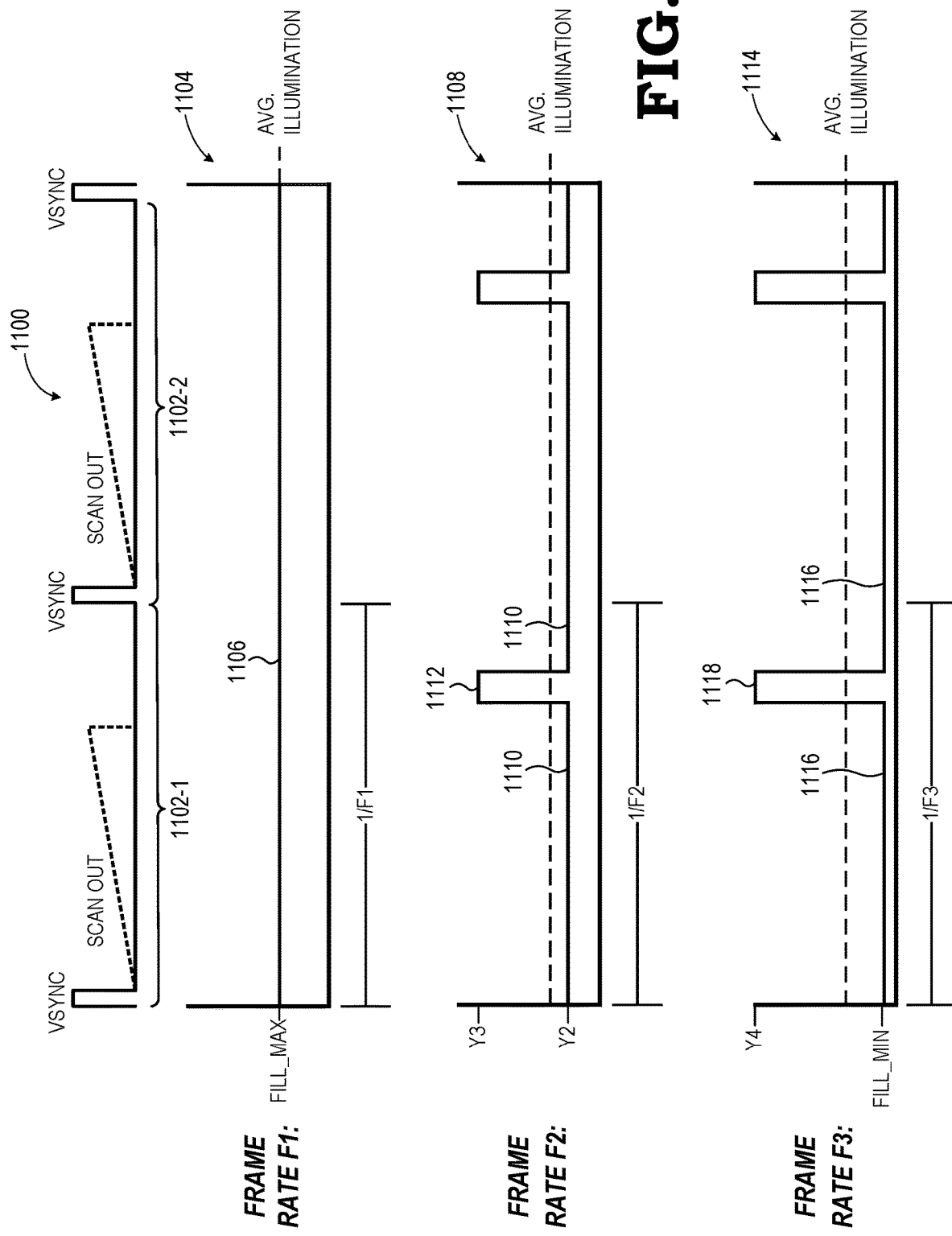
FIG. 11 is a diagram illustrating example illumination configurations for a display device at different frame rates based on the relationship of FIG. 10 in accordance with some embodiments.

Referring now to FIGS. 10 and 11, more detailed example relationships between frame rate (as an input parameter 902) and the illumination parameters employed for an illumination configuration is shown. FIG. 10 depicts two charts, chart 1000-1 and 1000-2, that illustrate specified relationships between use and level/duration of an illumination strobe and a corresponding level of a surrounding fill based on frame rate, so as to achieve a more suitable balance between flicker mitigation and motion blur mitigation than typically possible using only constant level illumination or strobe-only illumination. This specified relationship, in some instances, is generalized as increasing the output of an illumination strobe and decreasing the magnitude of illumination fill as frame rate increases, and vice versa. With this approach, reduced or eliminated strobe emphasis at lower frame rates mitigates the potential for perceptible flicker, while increased strobe emphasis and decreased fill emphasis at higher frame rates mitigates the potential for image ghosting and motion blur.

In the chart 1000-1, frame rate is represented by the abscissa, the left-side ordinate represents illumination level for both a strobe and a surrounding fill, and the right-side ordinate represents the duration for the strobe (fixed in this example). Line 1002 represents the strobe illumination level that varies between 0 and a maximum illumination level STRB_MAX1 based on frame rate. Line 1004 represents the illumination fill level that varies between 0 and a maximum illumination fill level FILL_MAX based on frame rate, where the surrounding fill level represents an illumination fill that both precedes and follows any illumination strobe present, or represents a constant illumination level in the absence of an illumination strobe. Line 1006 represents the duration, or width, of the illumination strobe, which in this example is fixed at WIDTH_C (e.g., 4 ms) in this example once an illumination strobe is activated (at frame rate F_LOW). The left-side ordinate represents the scale of the illumination level for the surrounding fill level, whereas the right-side ordinate represents the scale of the illumination level for the illumination strobe, when present.

As illustrated by lines 1002 and 1004, between a frame rate of 0 and F_LOW (e.g., 80 FPS), the illumination configuration relies entirely on the surrounding fill to provide the illumination, with a constant fill illumination level of FILL_MAX. At a frame rate F_LOW, an illumination strobe is activated, with the strobe having a fixed duration of WIDTH_C (as illustrated by line 1006). Thus, between frame rate F_LOW and F_HIGH (e.g., 120 FPS), the strobe illumination level increases (substantially linearly in this example) while the illumination level of the illumination fill reduces (non-linearly in this example) from the level FILL_MAX to zero. Thereafter, illumination is provided solely by the illumination strobe for frame rates between F_HIGH and F_MAX, with the strobe illumination level decreasing (non-linearly in this example) to compensate for the increasing strobe rate (due to increasing frame rate) so as to maintain a substantially constant illumination level. For each stage, the relationship between fill level, strobe level, and strobe duration is configured so as to maintain a substantially constant illumination level, regardless of frame rate. Thus, as illustrated by the stage between frame rate F_LOW and F_HIGH, as the strobe illumination level increases the fill illumination level decreases so that the overall illumination output is constant. Likewise, between frame rate F_HIGH and F_MAX, while the illumination strobe is the only illumination source, the illumination level of the strobe decreases with increase in frame rate in view of the increased number of strobes per second so as to maintain a constant illumination per unit time.

Turning to chart 1000-2, in this chart frame rate is represented by the abscissa, the left-side ordinate represents illumination level for both a strobe and a surrounding fill, and the right-side ordinate represents the duration for the strobe (variable in this example). Line 1012 represents the strobe illumination level that varies between 0 and a maximum illumination level STRB_MAX2 based on frame rate. Line 1014 represents the illumination fill level that varies between 0 and the maximum illumination fill level FILL_MAX based on frame rate, where the surrounding fill level represents an illumination fill that both precedes and follows any illumination strobe present, or represents a constant illumination level in the absence of an illumination strobe. Line 1016 represents the duration, or width, of the illumination strobe, which in this example varies based on frame rate up to a maximum duration WIDTH_MAX once an illumination strobe is activated (at frame rate F_LOW). The left-side ordinate represents the scale of the illumination level for the surrounding fill level, whereas the right-side ordinate represents the scale of the illumination level for the illumination strobe, when present.

As illustrated by lines 1012 and 1014, between a frame rate of 0 and F_LOW, the illumination configuration relies entirely on the surrounding fill to provide the illumination, with a constant fill illumination level of FILL_MAX. At a frame rate F_LOW, an illumination strobe is activated, with the strobe having a variable duration based on frame rate (as illustrated by line 1014). Thus, between frame rate F_LOW and F_HIGH, both the strobe illumination level and the strobe duration increases (substantially linearly in this example) while the illumination level of the illumination fill reduces (non-linearly in this example) from the level FILL_MAX to zero. Thereafter, illumination is provided solely by the illumination strobe for frame rates between F_HIGH and F_MAX, with the strobe duration constant at WIDTH_MAX and the strobe illumination level decreasing (non-linearly in this example) to compensate for the increasing strobe rate (due to increasing frame rate) so as to maintain a substantially constant illumination level. As with the relationships represented by chart 1000-1, the relationships between fill level, strobe level, and strobe duration represented in chart 1000-2 is configured so as to maintain a substantially constant illumination level, regardless of frame rate. Thus, as illustrated by the stage between frame rate F_LOW and F_HIGH, as the strobe output increases the fill illumination output decreases so that the overall illumination output is constant. Likewise, between frame rate F_HIGH and F_MAX, while the illumination strobe is the only illumination source, the illumination level of the strobe decreases (at a constant strobe duration) with increase in frame rate in view of the increased number of strobes per second so as to maintain a constant illumination per unit time.

FIG. 11 illustrates various example illumination configurations resulting from the relationship represented by chart 1000-1 of FIG. 10 at different frame rates. Timing chart 1100 illustrates a sequence of two frame periods 1102-1 and 1102-2 used as a reference for the respective timings of the illustrated illumination configurations. Note that the duration of the frame periods 1102-1 and 1102-2 are inversely proportional to the frame rate being referenced in the corresponding illumination configuration.

Illumination configuration 1104 represents an illumination configuration determined from chart 1000-1 at a frame rate F1 that is below the threshold frame rate F_LOW defining the lowest frame rate at which an illumination strobe is implemented (around 50 FPS, for example). Thus, as determined by the values of lines 1002 and 1004 at frame rate F1, for the illumination configuration 1104 the surrounding fill level is set to the maximum fill level FILL_MAX and the strobe illumination level is set to STROBE_MIN (e.g., 0), resulting in the illumination configuration 1104 having a constant illumination level 1106 across each of the frame periods 1102-1 and 1102-2. Displaying a sequence of frames at the frame rate F1 using this illumination configuration thus exhibits reduced or eliminated flicker as there is no strobe present.

Illumination configuration 1108 represents an illumination configuration determined from chart 1000-1 at a frame rate F2 that is above the threshold frame rate F_LOW but below a threshold frame rate F_HIGH at which the illumination strobe serves as the primary source of illumination during the frame period. In the example of chart 1000-1, the strobe illumination level increases as frame rate increases from F_LOW to F_HIGH as illustrated by the corresponding increasing segment of line 1002 (recall again that in this example, strobe duration is constant regardless of frame rate starting at frame rate F_LOW), while the surrounding fill illumination level decreases as frame rate increases from F_LOW to F_HIGH as illustrated by the corresponding decreasing segment of line 1004. Thus, as frame rate increases in this range, the strobe illumination level increases and the surrounding fill illumination level decreases commensurately. Accordingly, at the frame rate F2, the resulting illumination configuration 1108 includes a surrounding fill 1110 having an illumination level Y2 (<FILL_MAX) and an illumination strobe 1112 having an illumination level Y3. Thus, at the middle frame rates, including frame rate F2, the illumination configuration employs a balanced blend of strobe magnitude and fill magnitude, and thus achieving the reduced motion-blur benefit of employing an illumination strobe while also reducing the impact of flicker caused by the illumination strobe by surrounding the strobe with fill illumination, and thus reducing the net difference in illumination level change caused by the illumination strobe. Moreover, by using a moderate level of fill in the frame periods 1102-1 and 1102-2, a given average illumination for the frame periods is achievable with a lower-level illumination strobe, and thus requiring a lower transient current or other power output from the drivers of the backlight sources or emissive light pixels to implement the strobe, and enabling longer life for light sources such as OLED that degrade over time at stronger drive levels.

Illumination configuration 1114 represents an illumination configuration determined from chart 1000-1 at a frame rate F3 that is above the threshold frame rate F_HIGH at which the illumination strobe serves as the primary source of illumination during the frame period. In the example of chart 1000-1, the strobe illumination level reaches its maximum level STROBE_MAX1 at F_HIGH and then decreases for all frame rates above F_HIGH as illustrated by the corresponding downward sloped segment of line 1002 so as to maintain a substantially constant illumination per unit time, while the surrounding fill illumination level reaches its lowest illumination level FILL_MIN at frame rate F_HIGH. Thus, as frame rate increases in this range, the strobe illumination level gradually decreases with frame rate so as to maintain a constant illumination level in view of the increased frame rates (and thus increased strobe rate). Accordingly, at the frame rate F3, the resulting illumination configuration 1114 includes a surrounding fill 1116 having an illumination level FILL_MIN (<Y2) and an illumination strobe 1118 having an illumination level Y4 (>Y3). Thus, at higher frame rates (e.g., 100 FPS or above), including frame rate F3, the illumination configuration emphasizes use of an illumination strobe to reduce or elimination motion blur and deemphasizes surrounding fill as any flicker caused by the magnitude of change in illumination level between the surrounding fill and the strobe is unlikely to be detectable by the typical user at such frame rates. Moreover, as with illumination configuration 1108, by using a non-zero level of fill in the frame periods 1102-1 and 1102-2, the illumination configuration 1114 can provide a given average illumination for the frame periods with a lower-level illumination strobe, which requires a lower transient current or voltage from the drivers of the backlight sources or emissive light pixels to implement the strobe. However, in implementations in which the drive current at maximum strobe levels is not likely to substantially reduce the operational lifetime of the drivers or the light sources, the illumination configuration at the highest frame rates can, for example, employ illumination strobes only (that is, set all surrounding fill levels to zero).

As chart 1000-1 and the illumination configurations 1104, 1108, and 1114 illustrate, in the illustrated representation between frame rate and illumination levels, the corresponding illumination configuration switches from a constant illumination level configuration at lower frame rates, to a blended balance of illumination strobe to illumination fill at intermediate frame rates (with the balance tilting toward the illumination strobe as frame rate increase), to an illumination strobe-dominant configuration at the highest frame rates. In this manner, the illumination configuration can be tailored to address the visual artifacts more likely to appear at a given frame rate.

Figure 12:
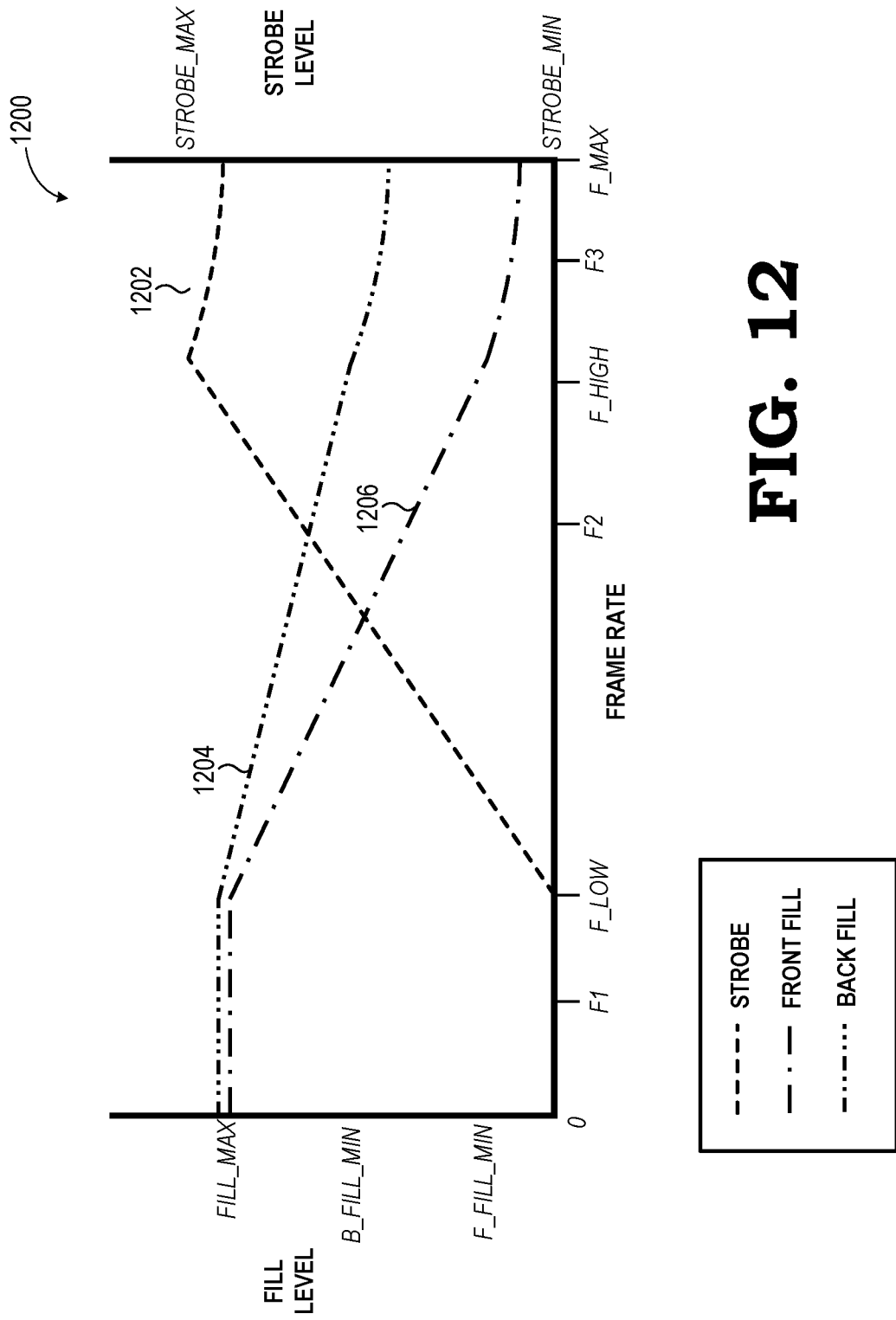
FIG. 12 is a diagram illustrating an example relationship between strobe, before-strobe fill, and after-strobe illumination outputs based on frame rate in accordance with some embodiments.
Figure 13:
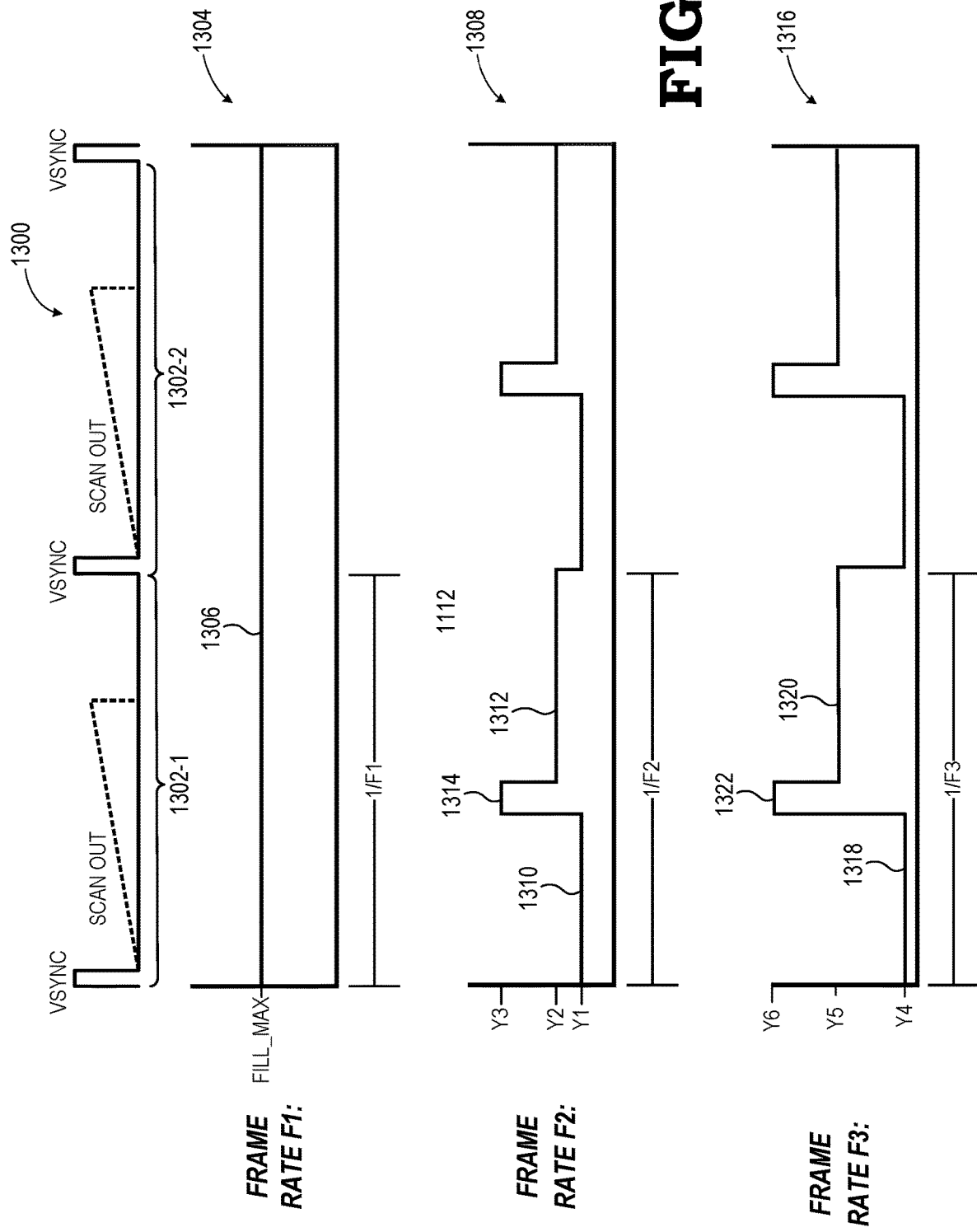
FIG. 13 is a diagram illustrating example illumination configurations for a display device at different frame rates based on the relationship of FIG. 12 in accordance with some embodiments.

FIGS. 12 and 13 illustrate another more detailed example relationship between frame rate (as an input parameter 902, FIG. 9) and the illumination levels employed for an illumination configuration is shown. The chart 1200 of FIG. 12 represents a relationship between frame rate (abscissa), a strobe illumination level (line 1202), a front fill illumination level (line 1204), and a back fill illumination level (line 1206). The left-side ordinate represents the scale of the illumination level for the front and back fill illumination levels, whereas the right-side ordinate represents the scale of the illumination level for an illumination strobe, when present. In this example, the strobe duration is fixed for ease of illustration, and thus the strobe output is varied based on variation of the strobe illumination level.

Chart 1200 represents an example implementation of a specified relationship between use and level of an illumination strobe and corresponding levels of front and back illumination fills based on frame rate so as to achieve a more suitable balance between flicker mitigation and motion blur mitigation than typically possible using only constant level illumination or strobe-only illumination. This specified relationship can be generalized as increasing the magnitude of an illumination strobe and decreasing the magnitude of illumination fill as frame rate increases, and vice versa. With this approach, reduced or eliminated strobe emphasis at lower frame rates mitigates the potential for perceptible flicker, while increased strobe emphasis and decreased fill emphasis at higher frame rates mitigates the potential for image ghosting and motion blur. Moreover, with respect to the front and back illumination fills, the represented relationship further can be generalized as reducing the front illumination fill level relative to the back illumination fill level as frame rate increases.

FIG. 13 illustrates various example illumination configurations resulting from the relationship represented by chart 1200 of FIG. 12 at different frame rates. Timing chart 1300 illustrates a sequence of two frame periods 1302-1 and 1302-2 used as a reference for the respective timings of the illustrated illumination configurations. Note that the duration of the frame periods 1302-1 and 1302-2 are inversely proportional to the frame rate being referenced in the corresponding illumination configuration.

Illumination configuration 1304 represents an illumination configuration determined from chart 1300 at a frame rate F1 that is below the threshold frame rate F_LOW defining the lowest frame rate at which an illumination strobe is implemented (around 50 FPS, for example). Thus, as determined by the values of lines 1202, 1204, and 1206 at frame rate F1, for the illumination configuration 1304 the front fill level and the back fill level both are set to the maximum fill level FILL_MAX and the strobe illumination level is set to STROBE_MIN (e.g., 0), resulting in the illumination configuration 1304 having a constant illumination level 1306 across each of the frame periods 1302-1 and 1302-2. Displaying a sequence of frames at the frame rate F1 using this illumination configuration thus exhibits reduced or eliminated flicker as there is no strobe present, and typically does not suffer from significant motion blur as motion blur is generally not readily detectable by the typical user as such low frame rates as motion judder typically is a more prominent issue at lower frame rates.

Illumination configuration 1308 represents an illumination configuration determined from chart 1200 at a frame rate F2 that is above the threshold frame rate F_LOW but below a threshold frame rate F_HIGH at which the illumination strobe serves as the primary source of illumination during the frame period. In the example of chart 1200, the strobe illumination level increases as frame rate increases from F_LOW to F_HIGH as illustrated by the corresponding increasing sloped segment of line 1202, while the front and back fill illumination levels decrease as frame rate increases from F_LOW to F_HIGH as illustrated by the corresponding decreasing sloped segments of line 1204 and 1206. Thus, as frame rate increases in this range, the strobe illumination level increases and the surrounding fill illumination level decreases proportionally. However, as also illustrated by chart 1200, the front fill level decreases at a greater rate than the back fill level as frame rate increases between the two thresholds F_LOW and F_HIGH, and thus resulting in the front illumination fill being deemphasized at a greater rate than the back illumination fill as frame rate increases. Accordingly, at the frame rate F2, the resulting illumination configuration 1308 includes a front illumination fill 1310 having an illumination level Y1 (<FILL_MAX), a back illumination fill 1312 having an illumination level Y2 (>Y1) and an illumination strobe 1314 positioned in between and having an illumination level Y3 (>Y2). Thus, at the middle frame rates, including frame rate F2, a resulting illumination configuration employs a balanced blend of strobe magnitude and fill magnitude, and thus achieving the reduced motion-blur benefit of employing an illumination strobe while also reducing the impact of flicker caused by the illumination strobe by surrounding the strobe with fill illumination, and thus reducing the net difference in illumination level change caused by the illumination strobe.

As described in more detail below, the row-by-row scan out of a frame to the display device and the setup times to configure each pixel to reflect the pixel data being scanned in (particularly for LC-based pixels) often results in the lower rows of pixels of the display matrix 318 not yet being fully configured to reflect the current frame being input (and instead representing corresponding pixels from the previous frame scanned in or a transitional state) in the early part of the frame period used to display the frame being scanned in. As such, illumination during this early part of the frame period can result in display of a blended image composed of the upper pixel rows of the current frame and the lower pixel rows of the previous frame—a phenomenon known as screen tearing. The potential for screen tearing increases with frame rate as the frame period shrinks relative to the scan in and setup time for a frame. Thus, by implementing a frame rate-fill illumination output relationship that increases the difference between the back illumination fill and the front illumination fill as frame rate increases between the frame rate thresholds F_LOW and F_HIGH, less illumination is generated during the early part of the frame period as frame rate increases, and thus reducing the impact of any inadvertent illumination of a blended frame during the early part of the frame period, while more illumination is generated during the latter part of the frame period as frame rate increases, and thus increasing the proportion of display light representing the display matrix 318 after all rows of pixels of the current frame have been scanned in and have time to settle. Thus, as frame rate increases and with it the risk of screen tearing and ghosting, the influence of display light generated in the early part of a frame period is decreased and the influence of display light generated in the later part of the frame period is increased, thereby scaling the screen-tearing/ghosting mitigation as risk of screen tearing/ghosting increases. This visibility of screen tearing also can be further decreased by extending the illumination fill 1310 and delaying the illumination strobe 1314 and illumination fill 1312 until the scan out of the new pixels in the frame represented by frame period 1302-1 has completed, although such delays would add latency in exchange for reduced screen tearing.

Illumination configuration 1316 represents an illumination configuration determined from chart 1200 at a frame rate F3 that is above the threshold frame rate F_HIGH at which the illumination strobe serves as the primary source of illumination during the frame period. In the example of chart 1200, the strobe illumination level reaches its maximum level STROBE_MAX at F_HIGH and then declines for all frame rates above F_HIGH as illustrated by the corresponding declining segment of line 1202, while the front fill level declines (at a greater rate) for all frame rates above F_HIGH to F_FILL_MIN at frame rate F_MAX as illustrated by the corresponding declining segment of line 1204. Similarly, the back fill level continues to decline at a greater rate until it reaches the minimum level B_FILL_MIN at frame rate F_MAX. Thus, as frame rate increases in this range, at least one of the strobe illumination level, the front fill level or the back fill level declines to maintain constant illumination. Accordingly, at the frame rate F3, the resulting illumination configuration 1316 includes a front illumination fill 1318 having an illumination level Y4 (<Y1), a back illumination fill 1320 having an illumination level Y5 (<Y2) and an illumination strobe 1322 having an illumination level Y6 (<=STROBE_MAX). Thus, at higher frame rates (e.g., 120 FPS or above), including frame rate F3, the illumination configuration emphasizes use of an illumination strobe to reduce or elimination motion blur and deemphasizes surrounding fill as any flicker caused by the magnitude of change in illumination level between the surrounding fill and the strobe is unlikely to be detectable by the typical user at such frame rates. Moreover, as with illumination configuration 1108, by using a non-zero level of fill in the frame periods 1102-1 and 1102-2, the illumination configuration 1114 can provide a given average illumination for the frame periods with a lower-level illumination strobe, which requires a lower transient current from the drivers of the backlight sources or emissive light pixels to implement the strobe. Further, as described above, the deemphasis of front illumination fill in favor of back illumination fill at these highest frame rates reduces the impact of any screen tearing potentially likely to occur at such high frame rates.

It should be noted that although charts 1000 and 1200 illustrate examples in which there are piecewise substantially linear relationships between frame rate and corresponding strobe and fill illumination levels for an illumination configuration for ease of description, in other embodiments these relationships are non-linear, piecewise or otherwise. Further, rather than having only two frame rate thresholds and a constant slope therebetween, the relationship between frame rate and a corresponding illumination level can have more than two inflection points.

Figure 14:
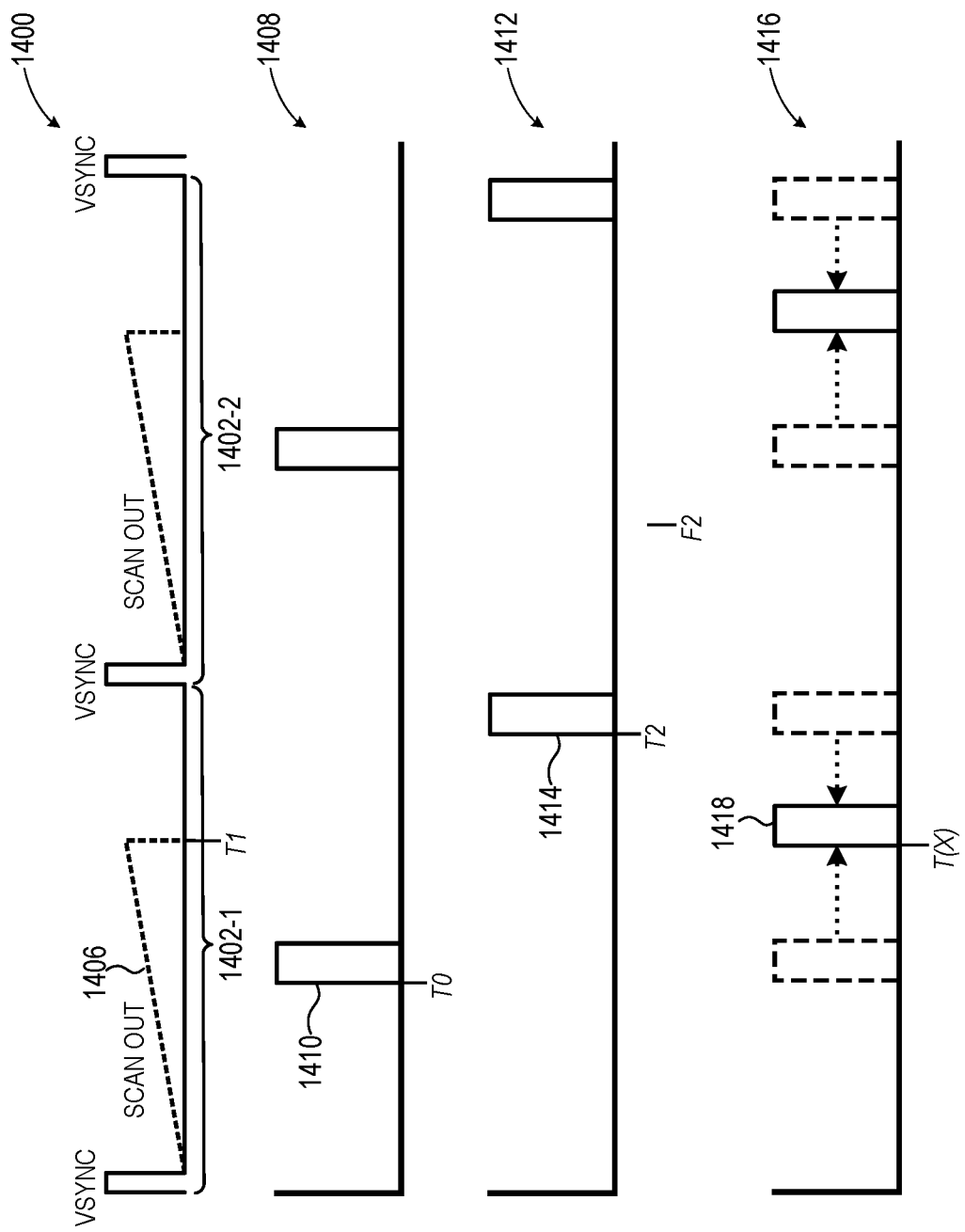
FIG. 14 is a diagram illustrating example illumination strobe timings in accordance with some embodiments.
Figure 15:
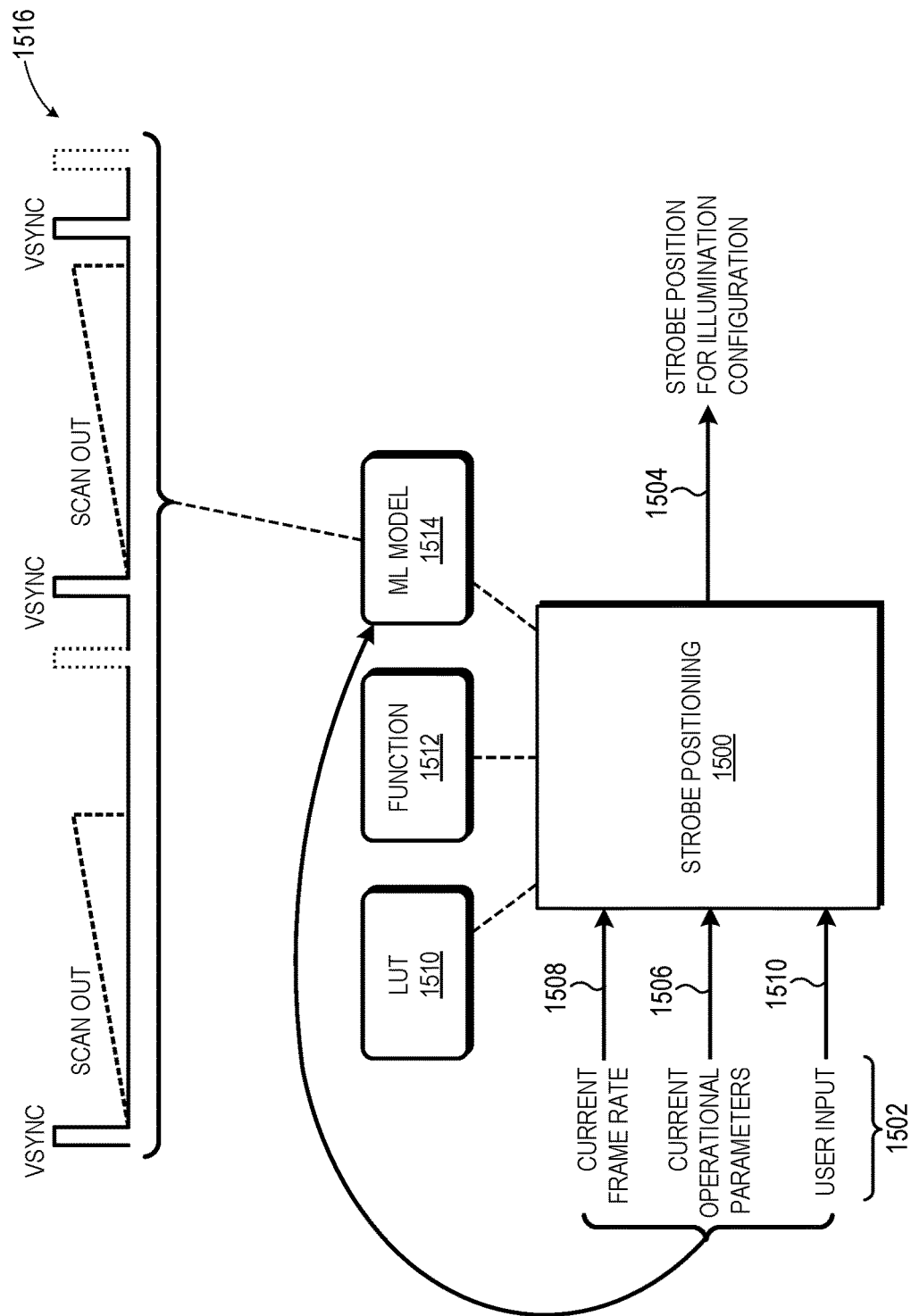
FIG. 15 is a diagram illustrating a technique for illumination strobe timing in accordance with some embodiments.

FIGS. 14 and 15 together illustrate the general process employed by the strobe position control techniques 204 (FIG. 2) in accordance with some embodiments. In at least one embodiment, this process can be implemented as an extension of method 800 in which the strobe position is determined in parallel with the strobe output determination process of block 808, and is described below in this context. Moreover, this process is described in an implementation context in which the source-side illumination control module 714 (FIG. 7) is responsible for determining the illumination configuration settings to be implemented. However, the process described below can be adapted for implementation by the display-side illumination control module 718 using the guidelines provided herein.

Turning to FIG. 14, timing chart 1400 illustrates a sequence of two frame periods 1402-1 and 1402-2 used as a reference for the respective timings of the illustrated strobe positioning process. As described above, at the start of a frame period 1402 (signaled by, for example, assertion of a VYSNC OR VBI), the pixel data for the frame to be displayed during the frame period is scanned out of the frame buffer on a row-by-row basis and transmitted to the display device (as represented by scan out line 1406), whereupon the display device 304 configures a corresponding row of the display matrix 318 based on the pixel data of the row of the frame currently being scanned in. The scan in of pixel data at each row is not instantaneous, but rather requires some time for the circuit elements representing the pixel to transition from a first state representing the corresponding pixel from the previous frame to a second state representing the corresponding pixel from the current frame. This transition is particularly long, relatively, for LCD displays due to the time needed for the LCs of the pixels to change state.

In timing chart 1400, time T1 represents the point in time in the frame period 1402-1 at which all rows of pixels for the current frame have been scanned in and the last row of pixels has settled to their new states. The duration from frame period start to time T1 is relatively independent of frame rate, that is, it typically takes approximately the same amount of time to fully scan in a frame into the display matrix 318 regardless of the rate at which frames are transmitted when using a variable frame rate technique such as the Radeon™ FreeSync™ technology available from Advanced Micro Devices, Inc. (otherwise the scan out time is usually extended to fill the frame time by using a lower pixel transfer rate). Thus, as frame rate increases (and frame period duration decreases), the time needed to scan in a frame and allow sufficient settling occupies an increasingly larger proportion of the frame period duration.

The position of an illumination strobe in the illumination configuration for a frame period has implications for display quality in view of the scan in and settling process. Starting an illumination strobe earlier in the frame period can reduce latency, but risks introducing screen tearing if the illumination strobe is activated before scan in and settling have completed for the current frame. To illustrate, illumination configuration 1408 implements an illumination strobe 1410 that is positioned to start at time T0 (<T1), and thus start when approximately the lower 40% of the rows of the current frame have not yet scanned in and settled. Accordingly, the illumination strobe 1410 will result in illumination of a hybrid frame which has approximately 60% of the upper rows of the current frame and approximately 40% of the lower rows of the previous frame (or some transitional states between the lower rows of the previous frame and the lower rows of the current frame). To avoid such artifacts, as illustrated by illumination configuration 1412, an illumination strobe 1414 instead is positioned closer to the end of the frame period, such as at time T2 (>T1). This allows the full frame to be scanned in and settled before initiating the illumination strobe, but introduces latency. Moreover, if the display device 304 implements variable frame rates and if the next frame period starts early, the illumination strobe could not actually activate during the current frame period, but instead shift too far into the early part of the next frame period, thereby causing failure to display the current frame and likely screen tearing for the next frame.

To achieve a suitable balance between risk of screen tearing of a too-early illumination strobe and the latency and potential skipped frame display of a too-late illumination strobe, as illustrated by illumination configuration 1416, the strobe position control technique 204 seeks to determine an appropriate position T(X) for the illumination strobe 1418 to be implemented in the illumination configuration 1416 that reduces or eliminates overlap with the scan out and settling period of the current frame while also reducing or eliminating the latency introduced by an overly-delayed strobe or skipped frame resulting from a strobe that is not positioned to activate before the start of the next frame period.

The strobe position control technique 204 is implemented separately or in conjunction with the frame rate-based illumination control technique 202 to set an illumination configuration. For example, in some implementations, the display system 300 uses either a constant fill configuration or a strobe-only configuration, depending on frame rate. When in a strobe-only configuration, the strobe position control technique 204 can be implemented to suitably position the strobe within the frame period. In other implementations, the display system uses a varying fill level and varying strobe output based on frame rate, in which case the strobe position control technique 204 can be used to position the strobe in the frame period along with one or both of a front illumination fill and a back illumination fill. However, it will be appreciated that the position of the illumination strobe defines the duration of both the front illumination fill and the back illumination fill, and thus the illumination levels set for the front and back illumination fills typically will be adjusted based on the duration of each fill in view of the strobe position that the average brightness of the frame period does not change depending on strobe position.

FIG. 15 illustrates a strobe positioning module 1500 that implements the strobe position control technique 204 so as to determine a suitable strobe position in accordance with some embodiments. The strobe positioning module 1500 receives one or more input parameters 1502, and from these, generate a representation 1504 of the position of an illumination strobe in the illumination configuration to be implemented for the illumination of the frame at issue at the display device 304. For purposes of description, the position of the illumination strobe is described as position within the frame period that the illumination strobe starts, or is activated. However, in other implementations, the position refers to a position of a middle of the illumination strobe or a position of an end of the illumination strobe. The representation 1504 of the strobe position can be expressed as a value that represents an absolute timing reference, such as a particular number of milliseconds or clock cycles from the start of a frame period, or an absolute timing reference, such as a particular percentage of the overall frame period (e.g., a value of <0.25> indicating that the illumination strobe should be initiated 25% of the way into a frame period). In at least one embodiment, the representation 1504 of the strobe position is included with the other parameter values of the representation of an illumination configuration transmitted to the display device 304 (or determined at the display device 304 itself). For example, a representation of an illumination configuration can be provided as metadata or sideband data in the form of a tuple with the format: <[strobe position], [strobe duration], [strobe level], [front fill level], [back fill level]>.

In one embodiment, the strobe positioning module 1500 utilizes one or more current operational parameters (signal 1506) of the display system 300 as input parameters 1502 for determining the appropriate strobe position in the corresponding illumination configuration. In particular, such operational parameters are representative of a current loading of the rendering device 302 and thus useful in predicting whether the next frame period will start early, late, or on time. For example, the current operating parameters can include a representation of a power state, representation of the complexity of the current frame being rendered or the next frame to be rendered, or other indicator of the current loading of the GPU 308, and thus indicate a probability as to the timing of the rendering and transmission of the next frame.

As explained above, the frame period is inversely proportional to the frame period, and as the scan in and settle time of a frame is relatively constant regardless of frame rate, and thus suitable timing of the position of the strobe within an illumination configuration becomes more pernicious with the increase in frame rate, as the timing window between end of the scan in and settling period and the end of the frame period becomes narrow, as well as because the likelihood that the next frame period will be delayed increases with an increase in frame rate. Accordingly, in some embodiments, the current frame rate (signal 1508) is utilized as one of the input parameters 1502 considered by the strobe positioning module 1500 in determining a suitable strobe position.

Sensitivity to screen tearing relative to sensitivity to latency, skipped frames, and judder often varies from user to user. For example, gamers often seek to minimize latency and accept the cost of more frequent screen tearing, whereas a casual viewer of a video often prefers to avoid screen tearing where possible at the cost of increased latency. Accordingly, user input 1510 (one embodiment of signal 912, FIG. 9) also is employed as an input parameter 1502 by the strobe positioning module 1500. To illustrate, one user provides user input indicating that earlier activation of the illumination strobe is preferable to later activation of the illumination strobe in view of reducing latency, whereas another user provides user input indicating that later activation of the illumination strobe is preferable so as to mitigate screen tearing. Also, different displays have different transition times from the previous pixel to the current pixel value, ranging from under 1 ms to many ms, especially with LC displays, affecting the visibility of tearing for a particular strobe position. A user input, or parameters retrieved from the display or a database of displays, facilitate varying the strobe position to better suit the monitor characteristics.

The relationship between the values of the input parameters 1502 and the resulting strobe position (as indicated by representation 1504) are represented at the rendering device 302 (or at the display device 304) using any of a variety of structures or mechanisms. In some embodiments, the relationship is represented using one or more LUTs 1510 or other tables, with each entry of the LUT 1510 being indexed based on one or a combination of input parameters and the corresponding entry containing the representation 1504, or a value upon which the representation 1504 is based. In other embodiments, the relationship between input parameter(s) 1502 and strobe positions(s) of an illumination configuration is provided by one or more functions 1512 or other functional algorithms implemented in software code and executed as part of, for example, the graphics driver 710 at the rendering device 302 or executed at the display controller 316 of the display device 304.

In yet other embodiments, the relationship between input parameter(s) 1502 and strobe positions for an illumination configuration is provided using a learned model 1514 developed using a neural network or other ML algorithm, which incorporates a history of some or all of the input parameters 1502 to train and refine the learned model 1514. To illustrate, in a variable frame rate implementation, the ML algorithm monitors a history 1516 of previous frame periods, including their starts and whether they started early, late, or on time, and correlate this information with various operating parameters, including GPU loading, power states, identification of the video content application 704 being executed, sharing of resources among various guests, and the like, and from this training input develop a learned model 1514 that estimates the start time of the next frame period based on the current operational parameters received. With the next frame start time predicted and with an understanding of the frame rate and other considerations, the learned model 926 then can provide a strobe position that avoids activating after the next frame start time while also seeking to avoid activating during the scan in and settle period.

The LUT(s) 1510, function(s) 1512, or learned model 1514 used to define the relationship between one or more operational parameters 1502 and corresponding strobe positions of the illumination configuration can be configured in any of a variety of ways. For example, an OEM or other supplier can run extensive modeling, simulations, or other testing to determine a suitable strobe position of each of some or all possible combinations of values of the input parameters 1502, and populate the one or more LUTs 1510 or configure the one or more functions 1512 accordingly. Further, in some emborements, user input can be used to originally populate the one or more LUTs 1510 or configure the one or more functions 1512, or to adjust previously-determined settings represented by the one or more LUTs 1510 or one or more functions 1512. Still further, as explained above, the relationship in some instances is a dynamic relationship as represented by, for example, the learned model 1514 that is continuously updated based on various training inputs, including the input parameters 1502 themselves.

Figure 16:
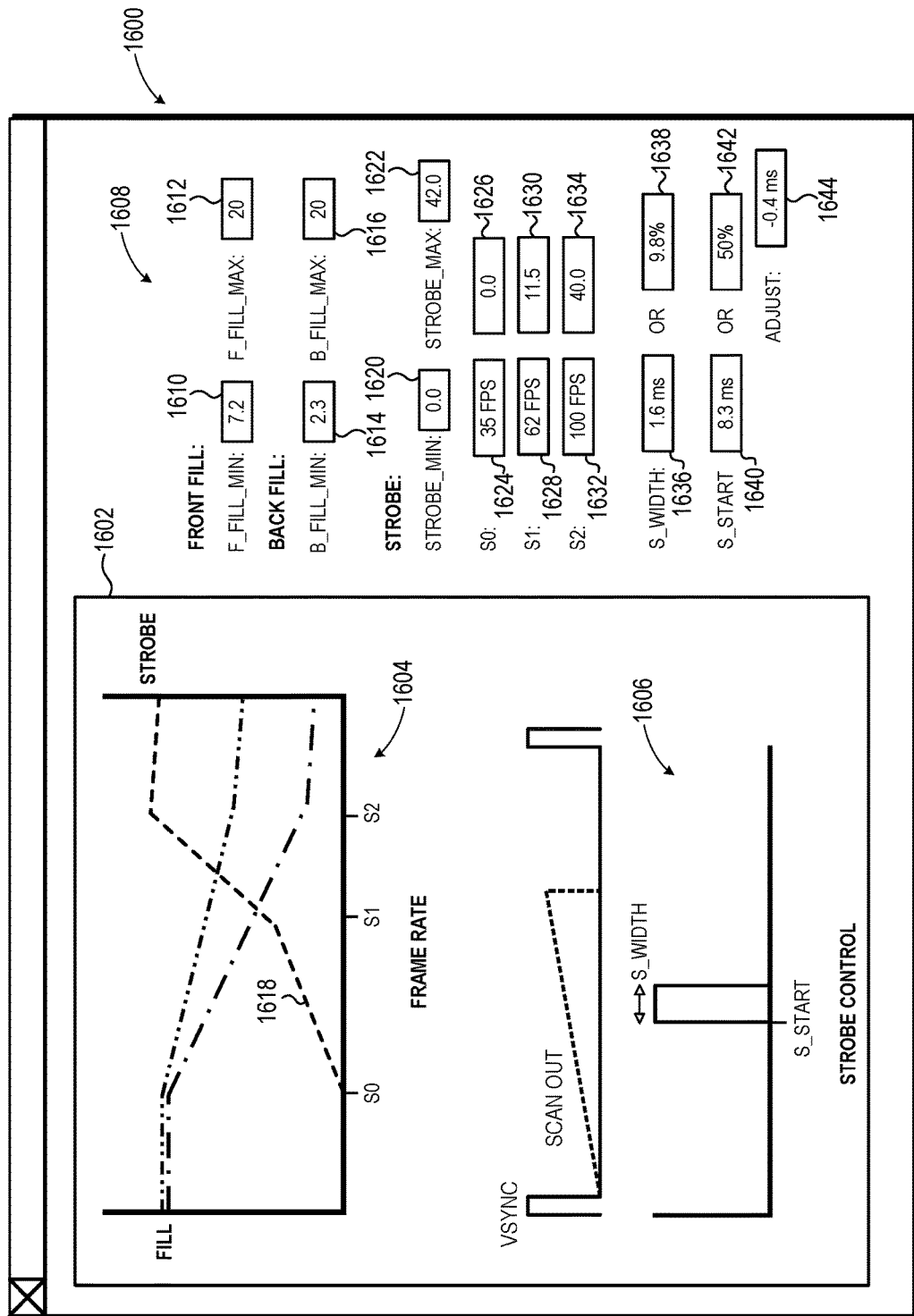
FIG. 16 is a diagram illustrating a graphical user interface to facilitate receipt of user input on various illumination control parameters in accordance with some embodiments.

As noted above, a user can provide user input that operates to either define some aspect of the relationship between various values one or input parameters and corresponding values for one or more parameters of an illumination configuration, including strobe positioning, strobe illumination level, strobe duration, and one or both of front and back fill levels. This input, in one embodiment, can be received via one or more GUIs presented to the user, such as the GUI 720 implemented by the graphics driver 710 at the rendering device (e.g., as a configuration GUI for the corresponding GPU 308) or the GUI 724 implemented at the display device 304 (e.g., as an on-screen display (OSD)). Alternatively, in one embodiment the GUI 724 is present on a local connected device such as a phone, or a completely remote location such as used for controlling a public billboard or movie theatre from a distant location. FIG. 16 illustrates an example GUI 1600 implemented as either GUI 720 or GUI 724 in accordance with some embodiments. The GUI 1600 typically includes one or more panels to graphically represent the relationships between input parameters and corresponding parameters of the illumination configuration, as well as one or more panels that implement input mechanisms to receive user input to set or adjust the illustrated relationships in a corresponding manner. As an example, the GUI 1600 can include a relationship panel 1602 that displays a chart 1604 that illustrates the current relationships between frame rate, the strobe illumination level, and the front and back fill levels. The relationship panel 1602 further can display a timing chart 1606 that illustrates the current setup for strobe positioning and strobe duration relative to the timing of the frame period, including the timing of the frame scan in and setup phase. Correspondingly, in this example the GUI 1600 includes an input panel 1608 that is to receive user input that sets or modifies one or more of the relationship parameters represented in chart 1604 or timing chart 1606. One example includes input fields 1610 and 1612 to receive user input setting or modifying the minimum illumination level (F_FILL_MIN) and maximum illumination level (F_FILL_MAX), respectively, for the front fill level of a resulting illumination configuration, as well as input fields 1614 and 1616 to receive user input setting or modifying the minimum illumination level (B_FILL_MIN) and maximum illumination level (B_FILL_MAX), respectively, for the back fill level of the resulting illumination configuration.

Similarly, the input panel 1608 can include input fields to configure one or more parameters of an illumination strobe. To illustrate, in the depicted example the relationship between strobe illumination level and frame rate is represented as a piecewise linear relationship (line 1618) with inflection points at frame rate S0 (which controls when use of an illumination strobe starts), at frame rate S1, and at frame rate S2 (which controls when the illumination strobe reaches its maximum illumination level). Accordingly, the input panel 1608 can include input fields 1620 and 1622 to receive user input setting or modifying the minimum illumination level (STROBE_MIN) and maximum illumination level (STROBE_MAX), respectively, of the illumination strobe, as well as input fields 1624, 1626, 1268, 1630, 1632, and 1634 to receive user input setting or modifying the particular frame rate values for the inflection points S0, S1, S2, as well as the strobe illumination level to be used at each of the inflection points. The input panel 1608 further can facilitate configuration of the strobe positioning through input fields 1636 or 1638 or strobe duration through input fields 1640 or 1642.

The input fields of the input panel 1608 can be implemented as fill-in fields, pull-down fields, and the like. In some instances, an absolute value is input to an input field. For example, the fields 1610, 1612, 1614, 1616 each receives a value falling within a specified range, where the value input directly represents the corresponding illumination level. As another example, the fields 1636 and 1640 controlling strobe positioning and strobe duration, respectively, receive values representing a value in milliseconds. In other instances, a relative value is input to an input field. For example, input fields 1636, 1638 can receive values that represent percentages of the duration of frame period, and thus are relative to the particular frame period at issue. Still further, rather than set a particular fixed value, the input panel 1608 can provide the ability for a user to specify an adjustment to a value that is dynamically determined by the display system 300. To illustrate, in some implementations the relationship between GPU loading, frame rate, and starting position of an illumination strobe is dynamic and frequently updated by a learned model. One user finds that the learned model results in a relationship that causes the illumination strobe to occur somewhat early in the frame period and thus trigger screen tearing instances more frequently than the user would otherwise prefer. Accordingly, the user provides an adjustment value in the input field 1644 that adds a static adjustment to whatever strobe position value is otherwise determined by the strobe positioning module 1500 (FIG. 15). For example, input of a value of −0.4 causes the strobe positioning module 1500 to shift the strobe position back by 0.4 milliseconds from the strobe position it otherwise would implement in the absence of the user input in order to accommodate the user.

Moreover, rather than, or in addition to, using input fields to obtain user input, in some embodiments one or more of the illustrated relationships are user manipulable via a mouse cursor, touchscreen, or other input mechanism so as to allow the user to graphically manipulate depicted graph or chart so as to achieve a desired relationship. For example, the inflection point S1 can be a graphical feature that the user can move along the abscissa and ordinate of the chart 1604 via a mouse cursor or touchscreen so as to change one or both of the frame rate value and the strobe illumination level associated with the inflection point.

Figure 17:
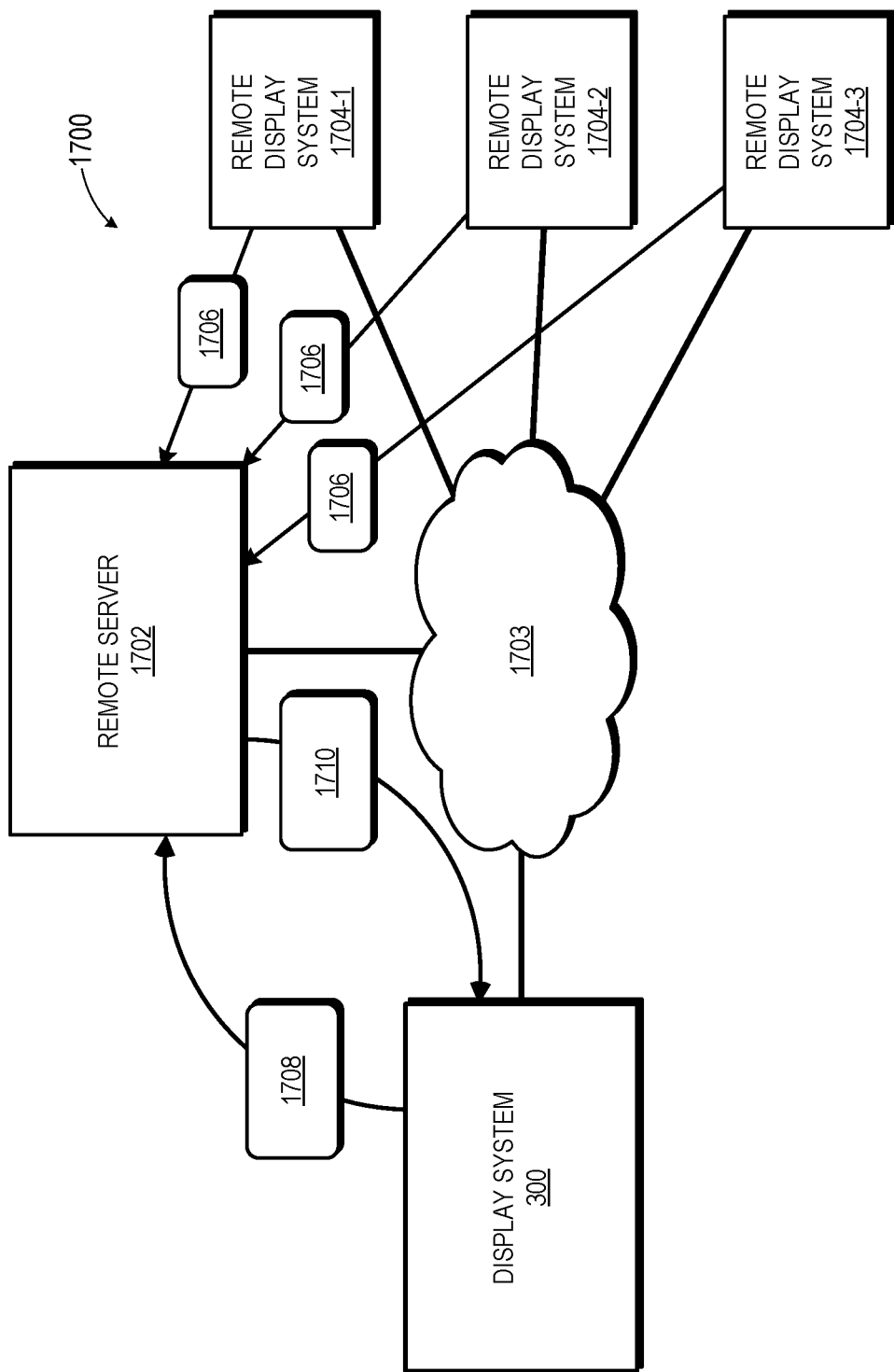
FIG. 17 is a diagram illustrating a technique for crowdsourced illumination control in accordance with some embodiments.

In addition to obtaining user input from a user of the display system 300 to define or modify the relationships between various input parameters and parameters of an illumination configuration to be implemented for one or more frames, in some embodiments relationships defined by other users of other display systems are used to set or modify the relationships implemented by the display system 300. FIG. 17 illustrates an example distributed system 1700 for providing such distributed relationship settings for an illumination configuration. The distributed system 1700 includes a remote server 1702 to which the display system 300 is connected via a network 1703 (e.g., a wireless local area network (WLAN), the Internet, etc.), as are one or more remote display systems, such as remote display systems 1704-1, 1704-2, 1704-3. Each of the remote display systems 1704 operate to generate and display sequences of frames, and utilize the techniques described herein to set illumination configurations for the display of the frames of these sequences.

In the course of operation, each remote display system 1704 sends an illumination configuration update 1706 to the remote server 1702. The illumination configuration update 1706 includes a representation of a relationship between one or more input parameters and one or more input configuration parameters as determined by the sending remote display system 1704 in its course of operation. This takes the form of, for example, one or more LUTs or other tables, descriptions of one or more software functions, a copy of a learned model, and the like. The illumination configuration update 1706 also includes information pertaining to the status of the remote display system 1704 itself at the time of generation of the relationship. This status information includes, for example, a serial number or model number of a component of the remote display system 1704, an identifier of the video content application serving as the source of the frames associated with the illumination configuration update 1706, representations of one or more hardware specifications or operational status (e.g., GPU loading) of the remote display system 1704, and the like.

The remote server 1702 receives the periodic illumination configuration updates 1706 from each of the remote display systems 1704 and integrates them into one or more remotely-trained illumination configuration relationships that represents a consensus or merging between various input parameters and the parameters for an output configuration that should result based on multiple systems' experiences. These remotely-trained illumination configurations then are categorized or indexed at the remote server 1702 using any of a variety of indicia, including hardware setup indicia, model indicia, identifiers of the particular video content application associated with the relationship and the like.

When preparing to execute the video content application 704, the display system 300 queries the remote server 1702 by sending an illumination configuration request 1708 to the remote server 1702. The illumination configuration request 1708 includes identifiers of various relevant parameters of the display system 300, such as serial number, model number, hardware specifications, identifier of the video content application 704, current GPU loading, user preferences, and the like. In response, the remote server 1702 identifies a suitable remotely-trained illumination configuration relationship 1710 that most closely matches the relevant parameters provided in the illumination configuration request 1708 and transmits the identified remotely-trained illumination configuration relationship 1710 to the display system 300 for implementation. As with the illumination configuration updates 1706, the remotely-trained illumination configuration relationship 1710 is represented by, for example, one or more LUTs, one or more software functions, one or more learned models, and the like.

As an example, the display system 300 could include a gaming console set to execute a particular video game (one embodiment of the video content application 704). The display system 300 thus sends an illumination configuration request 1708 that identifies the model of the gaming console and the particular video game about to be played. The remote server 1702 then identifies a remotely-trained illumination configuration relationship 1710 created as the result of feedback from one or more of the remote display systems 1704 that are of the same or similar gaming console executing the same or similar video game application, and thus allowing the display system 300 to rapidly tailor the illumination configuration for displaying the frames generated by the video game application to settings found useful by other players on other similar display systems without training or further user input.

Turning now to FIGS. 18-26, example implementations of the regional illumination control techniques 206 for display region-by-region illumination configuration control are described in greater detail. As noted above, these techniques employ a display device capable of individual illumination control on a per-region basis, where each illumination region is, for example, a subset of columns of the pixel array of the display device, a subset of rows of the pixel array, or a block of pixels that represents pixels at the intersection of a subset of one or more columns and a subset of one or more rows. These regional illumination control techniques 206 are employed separately, or in combination with each other, as well as in combination with one or more frame rate-based illumination control technique 202 or strobe position control technique 204 described above.

Figure 18:
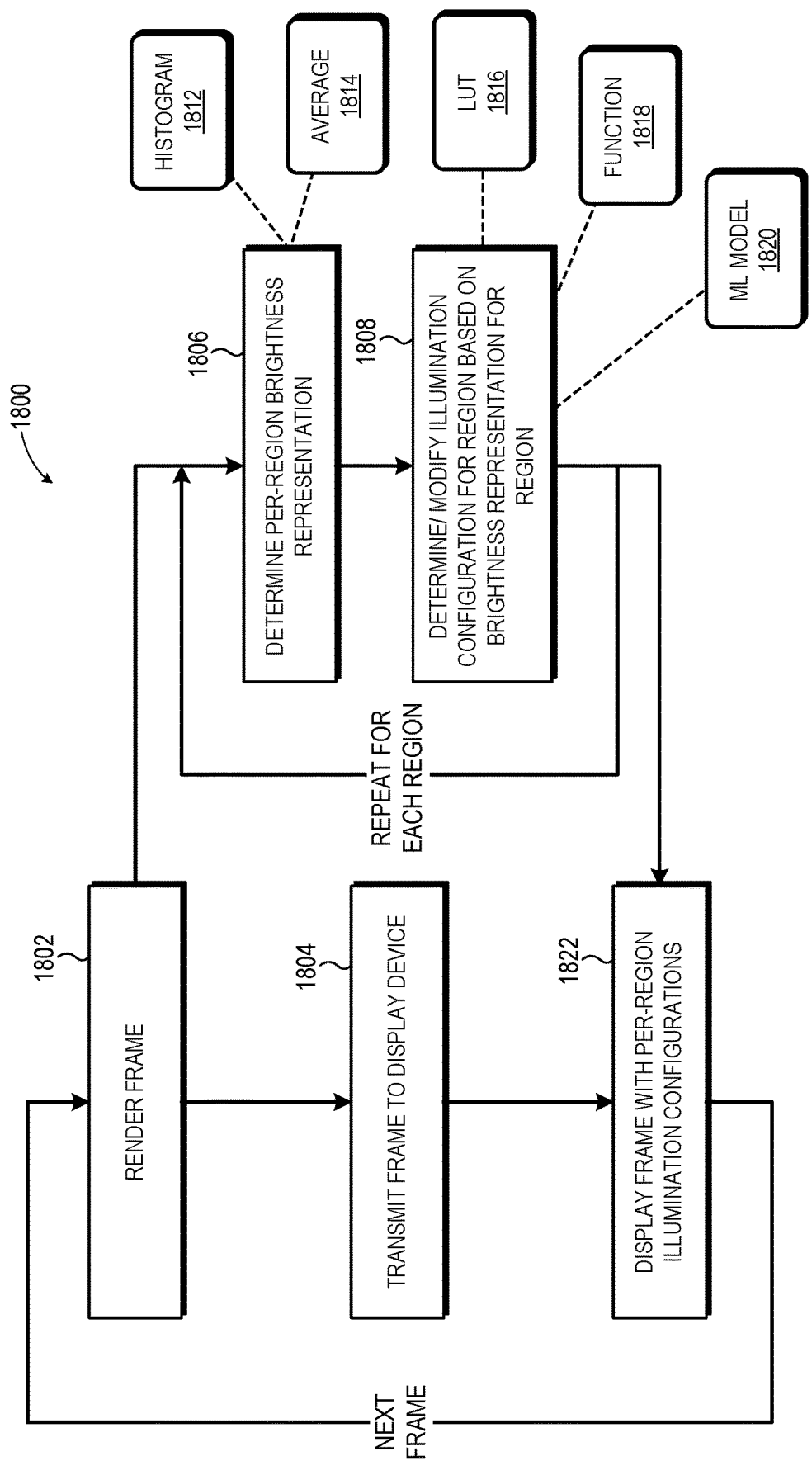
FIG. 18 is a flow diagram illustrating a method for per-region illumination control based on regional brightness in accordance with some embodiments.
Figure 19:
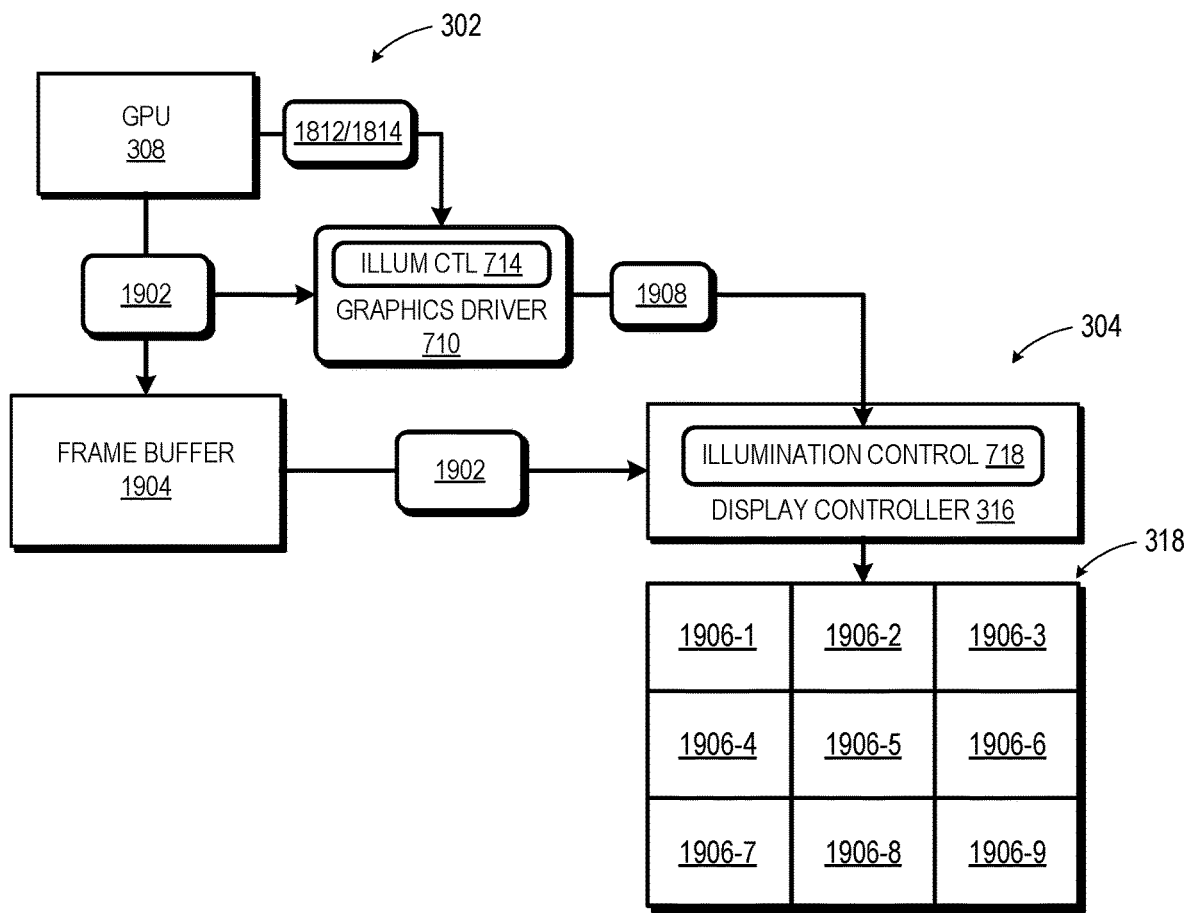
FIG. 19 is a diagram illustrating an example implementation for the method of FIG. 18 in accordance with some embodiments.

FIGS. 18 and 19 together illustrate an implementation of the brightness-based regional illumination control technique 212 for controlling the illumination configuration for a given illumination region based on an evaluation of a brightness of a region of the frame corresponding to the illumination region. The method 1800 of FIG. 18 illustrates the general flow of this technique in accordance with some embodiments, and is described with reference to the example implementation represented in FIG. 19 in which the source-side illumination control module 714 (FIG. 7) is responsible for determining the illumination configuration settings to be implemented by the display device 304. However, the process described below can be adapted for implementation by the display-side illumination control module 718 using the guidelines provided herein.

At block 1802, the GPU 308 renders or otherwise generates a frame 1902 in a sequence of frames at the direction of the video content application 704 and buffers the generated frame in a frame buffer 1904 at the rendering device 302. At block 1804, the display driver 712 then transmits the buffered pixel data and metadata representative of the generated frame 1902 on a row-by-row basis to the display device 304 via the interconnect 305.

Concurrent with the frame generation and transmission processes of blocks 1802 and 1804, the illumination control module 714 of the graphics driver 710 initiates the process of determining an illumination configuration for each illumination region of the display matrix 318. In the example of FIG. 19, the display matrix 318 is configured as a grid-based regional partitioning, having nine illumination regions 1906-1 to 1906-9. However, while a nine-region example is illustrated, it will be appreciated that the display matrix 318 can be segmented into more or fewer regions. In some instances, each pixel is represented as its own separate region, with each individual color element, or sub-pixel, analyzed for blur and flicker and illuminated separately. Accordingly, at block 1806 the illumination control module 714 selects an illumination region and determines a brightness representation for the region of the frame corresponding to the selected illumination region (this region of the frame referred to herein as the "frame region"). To illustrate, in some embodiments, the graphics driver 710 tasks the GPU 308 with generating a histogram 1812 for the frame region, with the histogram 1812 indicating the number of pixels within the frame region having a corresponding pixel value, or falling within a corresponding pixel value range or "bucket." The illumination control module 714 then determines the brightness representation for the frame region based on the histogram 1812. For example, the brightness representation indicates the number or proportion of pixels having a pixel value greater than a threshold pixel value, an average pixel value for the pixels in the histogram 812, and the like. In other embodiments, the graphics driver 710 tasks the GPU 308 with generating an average brightness value 1814 for the frame region (e.g., akin to an average picture level (APL), but for that particular frame region rather than the entire frame), and the brightness representation for the frame region thus includes, or is based on, this average brightness value. Note that, in some embodiments, the brightness representation is determined based on, the white luminance level, whereas in other embodiments a separate brightness representation is determined for each of the individual sub-colors and luminance. For ease of illustration, calculation of the brightness representation based on the white luminance level is utilized in the descriptions and examples below.

At block 1808, the illumination control module 714 either determines an illumination configuration for the illumination region or modifies an illumination configuration previously identified for the illumination region based on the brightness representation of the region. To illustrate, in some embodiments, the illumination control module 714 determines a default illumination configuration for the frame using one or a combination of the techniques described above, and then the illumination control module 714 modifies the default illumination configuration for each illumination region based on the brightness representation of the corresponding frame region to generate a particular region-specific illumination configuration. For example, as described below, the brightness representation can be used to increase the strobe output and decrease a fill output from their default levels, or conversely decrease the strobe output and increase a fill output from their default levels. In other embodiments, the brightness representation is used to select a particular illumination configuration from a set of predefined illumination configurations for use for that region.

The relationship between the brightness representation of a frame region and corresponding illumination configuration for an illumination region (or modification to a default illumination configuration on a per-region basis) in one embodiment is implemented using one or more LUTs 1816, one or more software functions 1818, or a learned model 1820 developed by an ML algorithm trained on previous use and previous user input on various settings. For example, a LUT 1816 has a plurality of entries indexed based on a corresponding brightness representation, or corresponding range of brightness representations, and with each corresponding entry storing a representation of a corresponding illumination configuration, including values for parameters such the particular front illumination fill level, back illumination fill level, strobe level, strobe position, strobe duration, and the like. As another example, a default frame-wide illumination configuration is specified, and each entry of the LUT 1816 includes an indication of a particular modification to the default illumination configuration, such as specifying an amount by which the strobe level is to be decreased from the default strobe level and an amount by which the fill level is to be increased form the default strobe level. As the flicker caused by an illumination strobe typically is more noticeable at brighter pixel levels and less noticeable at darker pixel levels, in at least one embodiment, the relationship between brightness representation and the corresponding region-specific illumination configuration is one that causes illumination strobe to be deemphasized and fill level to be emphasized in brighter frame regions and, conversely, causes illumination strobe to be emphasized and fill level to be deemphasized in darker frame regions. To illustrate, for a first frame region having a brightness representation above a high threshold and thus indicating the first frame region has a high average brightness, the illumination control module 714 in this example implements a constant level fill illumination configuration for the illumination region associated with the first frame region, whereas for a second frame region having a brightness representation below a low threshold and thus indicating the second frame region has a low average brightness, the illumination control module 714 in this example implements a strobe-only illumination configuration for the illumination region associated with the second frame region. However, for a third frame region having a brightness representation between the low and high thresholds, the illumination control module 714 linearly or non-linearly adjusts a strobe output and a fill output in opposite directions based on the brightness representation so that the strobe output is emphasized and the fill output deemphasized as average brightness increases within this range.

The illumination control module 714 repeats the process of blocks 1806 and 1808 for each illumination region of the display matrix 318 so as to determine a region-based illumination configuration (or region-based illumination configuration modification) for each illumination region, and transmits a representation 1908 of the illumination configuration, or illumination configuration modification, for each illumination region to the illumination control module 718 implemented at the display controller 316 of the display device 304. For example, the representation 1908 can include a data structure having an entry for each of illumination regions 1906-1 to 1906-9, with each entry storing values for the various parameters of the illumination configuration to be implemented for that illumination region. Alternatively, the data structure includes an entry representing a general illumination configuration, and each region-associated entry includes data indicating how the general illumination configuration is to be modified to create a regions-specific illumination configuration for that region.

At block 1822, the display device 304 proceeds with display of the frame 1902 during its corresponding frame period. As part of this process, the illumination control module 718 controls, via the display controller 316, the illumination at each illumination region of the display matrix 318 during the frame period for the frame 1902 so as to implement the illumination configuration for that illumination region as specified in the per-region representation 1908. In other embodiments, the illumination control module 714 transmits one or more data structures with values representing the brightness representation for each frame region, and it is the illumination control module 718 that determines or modifies an illumination configuration for each illumination region based on the received brightness representation for that region. In yet other embodiments, rather than receive the brightness representations from the rendering device 302, the illumination control module 718 of the display device 304 determines the brightness representations for each frame region (e.g., by generating a histogram or other per-region brightness representation) at the display device 304, and then determining a per-region illumination configuration based on the locally-determined per-region brightness representations.

Figure 20:
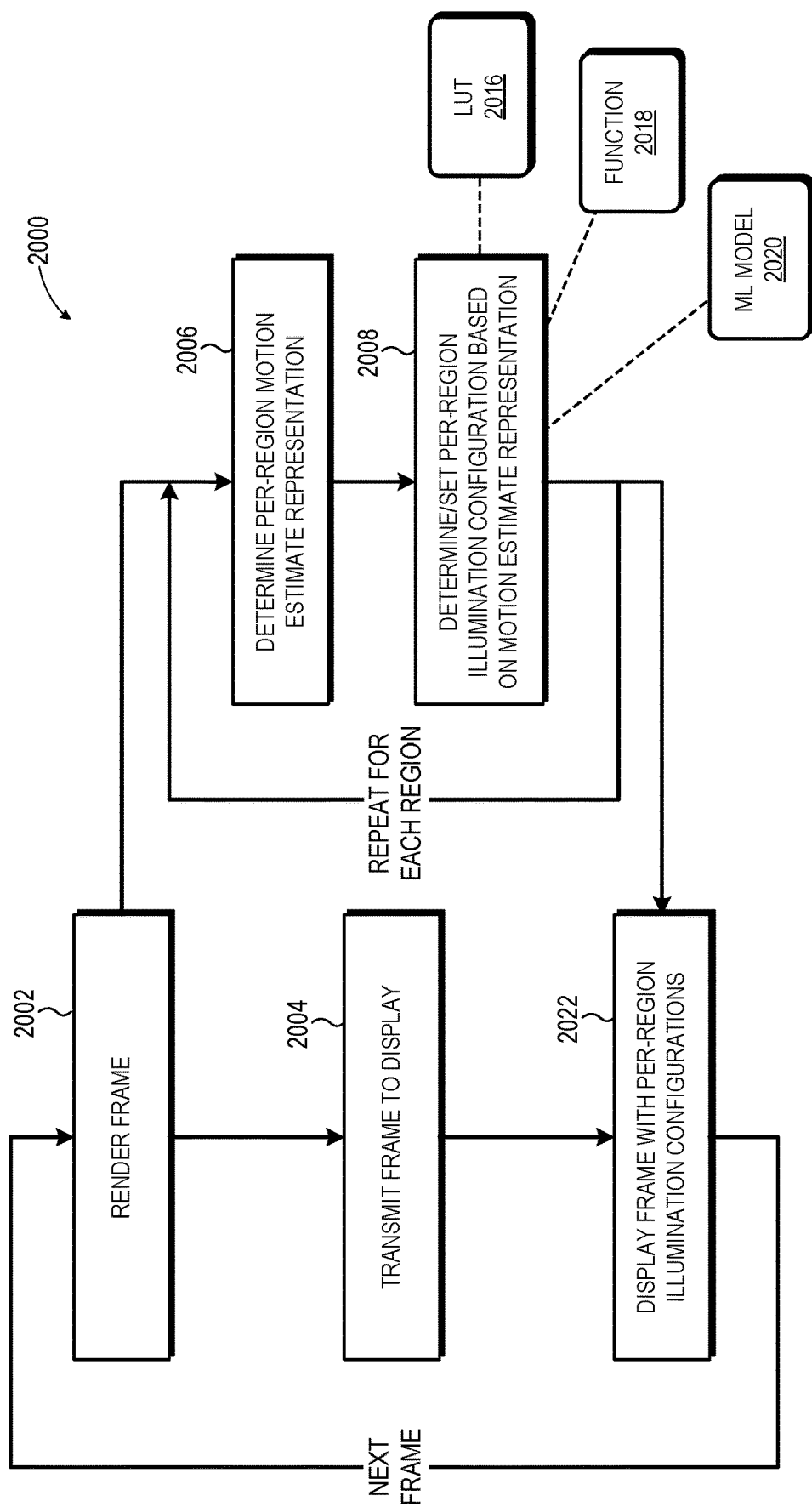
FIG. 20 is a flow diagram illustrating a method for per-region illumination control based on regional motion estimations in accordance with some embodiments.
Figure 21:
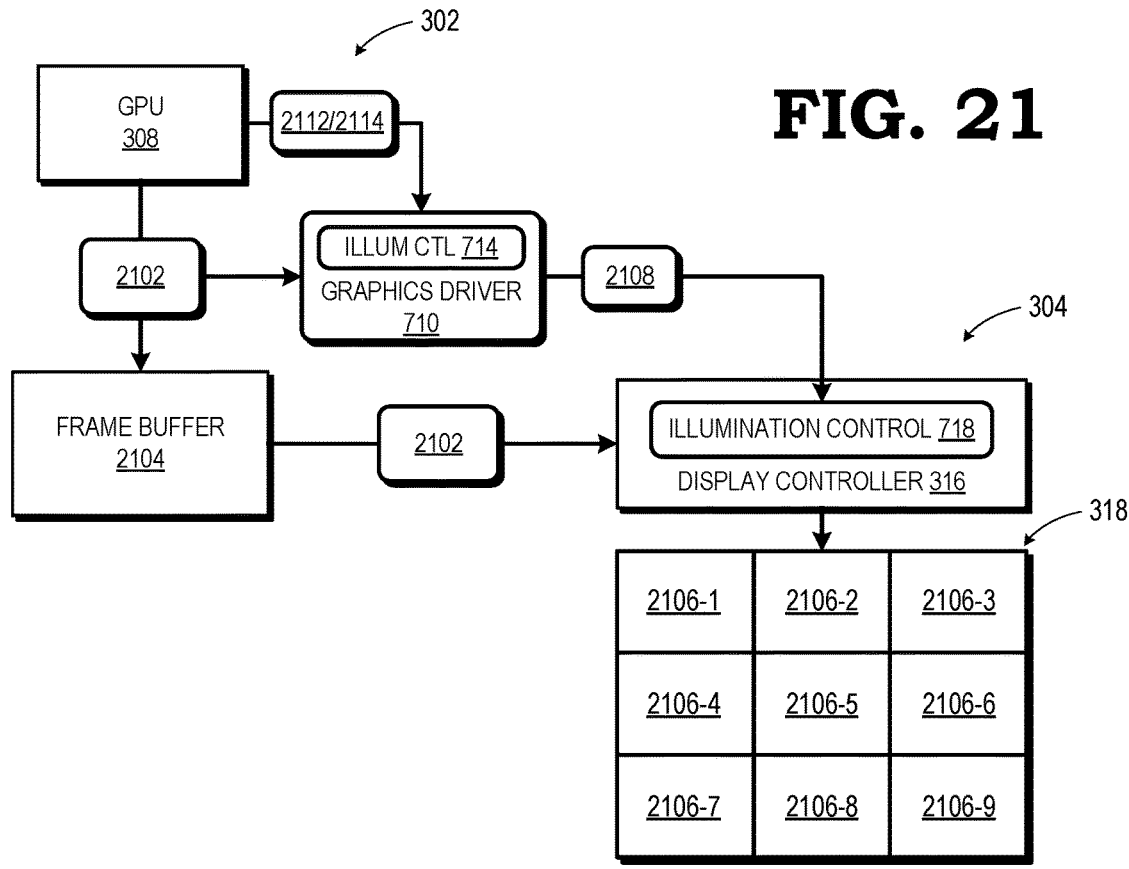
FIG. 21 is a diagram illustrating an example implementation for the method of FIG. 20 in accordance with some embodiments.
Figure 22:
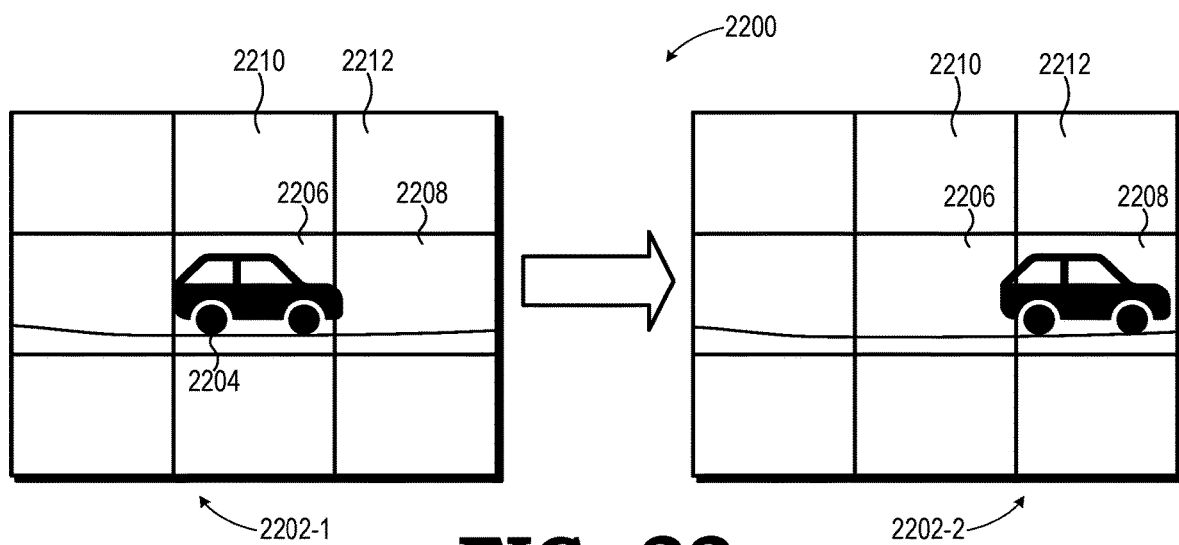
FIG. 22 is a diagram illustrating an example application of the method of FIG. 20 to two successive frames in accordance with some embodiments.

FIGS. 20-22 together illustrate an implementation of the motion-based regional illumination control technique 214 for controlling the illumination configuration for a given illumination region based on an estimation of motion in the corresponding frame region. The method 2000 of FIG. 20 illustrates the general flow of this technique in accordance with some embodiments, and is described with reference to the example implementation represented in FIG. 21 in which the source-side illumination control module 714 (FIG. 7) is responsible for determining the illumination configuration settings to be implemented by the display device 304. However, the process described below can be adapted for implementation by the display-side illumination control module 718 using the guidelines provided herein.

At block 2002, the GPU 308 renders or otherwise generates a frame 2102 in a sequence of frames at the direction of the video content application 704 and buffers the generated frame in a frame buffer 2104 at the rendering device 302. At block 2004, the display driver 712 then transmits the buffered pixel data and metadata representative of the generated frame 2102 on a row-by-row basis to the display device 304 via the interconnect 305.

Concurrent with the frame generation and transmission processes of blocks 2002 and 2004, the illumination control module 714 of the graphics driver 710 initiates the process of determining an illumination configuration for each illumination region of the display matrix 318 based on motion estimations for each corresponding frame region. In the example of FIG. 21, the display matrix 318 is configured as a grid-based regional partitioning, having nine illumination regions 2106-1 to 2106-9. Accordingly, at block 2006 the illumination control module 714 selects a region of the current frame and determines motion estimation region representation for the frame region corresponding to the selected region.

As is well understood in the art, motion estimation is a process of determining the transformation of a previous frame into the current frame. Typically, motion estimation reflects a comparison of the current frame to the preceding frame or other previous reference frame, and determining motion vectors that represent the movement of objects or pixel blocks from their positions in the reference frame to their positions in the current frame. The GPU 308 can use any of a variety of well-known or proprietary techniques to determine the motion vectors representing the motion for the current frame, including Full Search and other block-matching techniques, phase-correlation techniques, frequency-matching techniques, pixel recursive techniques, and optical flow techniques. From the motion vectors determined for the frame, the GPU 308 or other component of the rendering device 302 then determines a motion estimate representation for each of the frame regions corresponding to illumination regions 2106-1 to 2106-9 based on the motion vectors that have an origin in the subject region of the current frame, on the motion vectors that have a destination in the subject region of the current frame, or a combination thereof. To illustrate, in one embodiment, the GPU 308 tallies the number of macroblocks or coding tree units (CTUs) in the frame region that have a motion vector (or a motion vector above a certain magnitude threshold to filter jitter) and then determines a motion estimate representation for this frame region based on this number. As another example, in another embodiment the GPU 308 generates an average motion vector magnitude or other statistical evaluation from the motion vectors of the macroblocks or CTUs in the frame region and generate the motion estimation representation for this frame region based on this statistical evaluation.

At block 2008, the illumination control module 714 either determines an illumination configuration for the illumination region or modifies an illumination configuration previously identified for the region based on the motion estimate representation of the corresponding frame region. To illustrate, in some embodiments, the illumination control module 714 determines a default illumination configuration for the frame using one or a combination of the techniques described above, and then the illumination control module 714 modifies the default illumination configuration for each illumination region based on the motion estimate representation of the frame region to generate a particular region-specific illumination configuration. In other embodiments, the motion estimation representation is used to select a particular illumination configuration from a set of predefined illumination configurations for use for that region.

The relationship between the motion estimation representation for a frame region and corresponding illumination configuration for a corresponding illumination region (or modification to a default illumination configuration on a per-region basis) can be implemented using one or more LUTs 2016, one or more software functions 2018, or a learned model 2020 developed by an ML algorithm trained on previous use and previous user input on various settings. For example, a LUT 2016 has a plurality of entries indexed based on a corresponding motion estimation representation, or corresponding range of motion estimation representations, and with each corresponding entry storing a representation of a corresponding illumination configuration, including values for parameters such the particular front illumination fill level, back illumination fill level, strobe level, strobe position, strobe duration, and the like. As another example, a default frame-wide illumination configuration is specified, and each entry of the LUT 2016 includes an indication of a particular modification to the default illumination configuration, such as specifying an amount by which the strobe level is to be decreased from the default strobe level and an amount by which the fill level is to be increased form the default strobe level.

With regard to the relationship between motion estimation for a frame region and illumination configuration control, it is noted that frame regions having relatively low motion are less likely to suffer from motion blur, and thus implementation of a pronounced illumination strobe for the corresponding illumination region is likely unnecessary for motion blur mitigation, but could introduce flicker depending on the frame rate without any benefit. Conversely, frame regions having relatively high motion are likely to exhibit motion blur, and for such regions an illumination strobe is emphasized. Accordingly, in at least one embodiment, the relationship implemented by the illumination control module 714 to set or modify an illumination configuration for the illumination region generally provides for increasing strobe emphasis and decreasing fill emphasis with an increase in motion estimation, and conversely, for decreasing strobe emphasis and increasing fill emphasis with a decrease in motion estimation for the frame region. Thus, for a scheme in which a frame-wide default or general illumination configuration is modified on a region-by-region basis, the illumination control module 714 can use the motion estimate representation to decrease the strobe output and increase a fill output from their default levels for a frame region identified as containing relatively little motion, or conversely increase the strobe output and decrease a fill output from their default levels for a region identified as containing relatively high motion. To illustrate, for a first frame region having a motion estimation representation below a low threshold and thus indicating the first frame region has a very low or zero motion estimation, the illumination control module 714 in one embodiment implements a constant level fill illumination configuration for the illumination region corresponding to the first frame region, whereas for a second frame region having a motion estimation representation above a high threshold and thus indicating the second frame region has a very high motion estimation, the illumination control module 714 in one embodiment implements a strobe-only illumination configuration for the illumination region corresponding to the second frame region. However, for a third frame region having a motion estimation representation between the low and high thresholds, the illumination control module 714 linearly or non-linearly adjusts one or both of a strobe level and duration and a fill level in opposite directions based on the motion estimation representation so that the strobe output is emphasized and the fill output deemphasized as motion estimation increases within this range.

The illumination control module 714 repeats the process of blocks 2006 and 2008 for each frame region of the frame corresponding to an illumination region of the display matrix 318 so as to determine a region-based illumination configuration (or region-based illumination configuration modification) for each illumination region, and transmits a representation 2108 of the illumination configuration, or illumination configuration modification, for each illumination region to the illumination control module 718 implemented at the display controller 316 of the display device 304. As similarly described above, the representation 2108 can include a data structure having an entry for each of illumination regions 2106-1 to 2106-9, with each entry storing values for the various parameters of the illumination configuration to be implemented for that illumination region. Alternatively, the data structure includes an entry representing a general illumination configuration, and each region-associated entry includes data indicating how the general illumination configuration is to be modified to create a regions-specific illumination configuration for that illumination region.

At block 2022, the display device 304 proceed with display of the frame 2102 during its corresponding frame period. As part of this process, the illumination control module 718 controls, via the display controller 316, the illumination at each illumination region of the display matrix 318 during the frame period for the frame 2102 so as to implement the illumination configuration for that illumination region as specified in the per-region representation 2108. In other embodiments, the illumination control module 714 transmits one or more data structures with values representing the motion estimation representation for each illumination region, and it is the illumination control module 718 that determines or modifies an illumination configuration for each illumination region based on the received motion estimation representation for that region.

To illustrate an example of the method 2000, FIG. 22 depicts an example sequence 2200 of two frames 2202-1 and 2202-2, with frame 2202-1 preceding frame 2202-2 in display order. Each of the frames 2202-1 and 2202-2 is partitioned into a 3×3 grid of frame regions, with each frame region corresponding to an independently-controlled illumination region of the display matrix 318. In this example, the sequence 2200 represents motion of pixel content representing an automobile object 2204 as it travels horizontally, with the bulk of the pixel content originating in a region 2206 of frame 2202-1 and appearing in a frame region 2208 of frame 2202-2. Assume, for this example, that there is no other motion of significance in the sequence. Thus, for frame 2202-2, frame regions 2206 and 2208 exhibit considerable motion from the preceding frame 2202-1, and thus frame regions 2206 and 2208 for frame 2202-2 would be assigned motion estimate representations with high values representing considerable motion, whereas the remaining frame regions of the frame 2202-2 would be assigned motion estimate representations with low values representing low or zero motion. Accordingly, for each of frame regions 2206 and 2208, the illumination control module 714 would generate a region-specific illumination configuration that provides a prominent illumination strobe and deemphasized illumination fill (including no illumination fill) so as to mitigate the motion blur that otherwise potentially would occur in the two corresponding illumination regions with a less emphasized illumination strobe. For frame regions 2210 and 2210 that contain a slight amount of motion and thus are represented by small, non-zero motion estimate representations, the illumination control module 714 would generate a region-specific illumination configuration that balances the strobe output and the fill output based on the motion estimation representation for the frame region so as to balance the risk of motion blur versus flicker in the associated illumination region. For each of the remaining regions, the illumination module 714 would generate a region-specific illumination configuration that provides a prominent illumination fill and deemphasized illumination strobe (including no strobe, or a constant-level fill illumination) so as to mitigate the flicker that otherwise potentially would occur in these illumination regions if a more prominent strobe were to be used.

Figure 23:
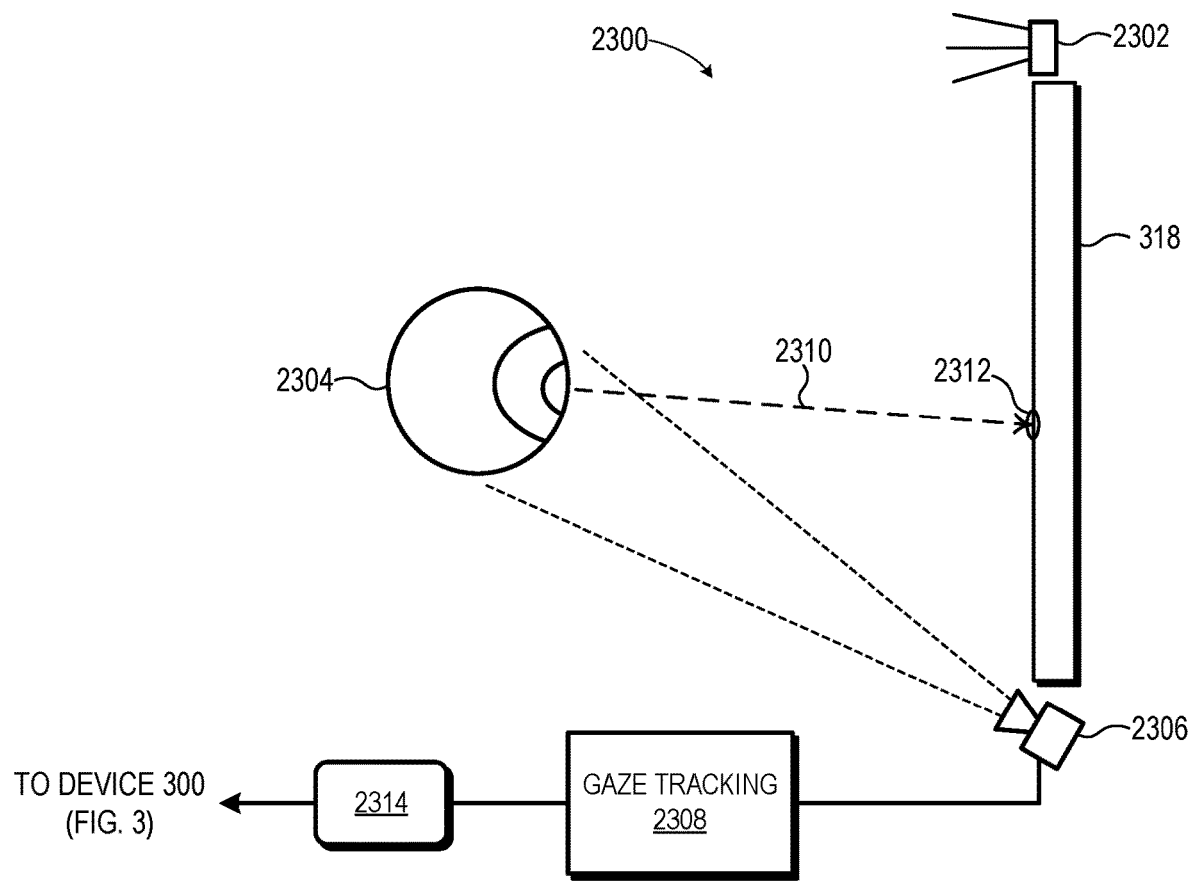
FIG. 23 is a diagram illustrating a gaze tracking subsystem for the display system of FIG. 3 in accordance with some embodiments.

FIGS. 23-26 together illustrate an implementation of the foveated regional illumination control technique 216 for controlling the illumination configuration for a given illumination region based on whether the illumination region is a foveal region or a peripheral region. In order to implement such a technique, the display system 300 utilizes a gaze tracking subsystem 2300 for determining the current gaze position of a user, as illustrated by FIG. 23. In at least one embodiment, the gaze tracking subsystem 2300 utilizes one or more light sources 2302 (e.g., infrared (IR) LEDs) co-located with the display matrix 318 of the display device 304 to illuminate one or both eyes 2304 of a user, as well as one or more imaging cameras 2306 directed toward the position of the eyes 2304 so as to capture imagery of the user's eyes 2304 as illuminated by the light sources 2302. A gaze tracking module 2308 analyzes the captured imagery to determine a current gaze direction 2310 of the eyes 2304 using any of a variety of well-known or proprietary gaze tracking techniques, and from a known geometrical configuration between the position of the imaging camera 2306, the position of the display matrix 318, the position of the user's eyes 2304, and the gaze direction 2310, triangulates the current gaze position 2312; that is, the point on the display matrix 318 that is the target of the user's current foveal view. The gaze tracking module 2308 then provides a gaze position representation 2314 of the current gaze position 2312 to the graphics driver 710, the GPU 308, or other component of the rendering device 302. The gaze position representation 2314 can include, for example, an (X,Y) coordinate pair identifying the (X,Y) position of the current gaze position 2312 relative to the pixels of the display matrix 318, a value identifying the illumination region of the display matrix 318 that contains the location of the current gaze position 2312, and the like.

Figure 24:
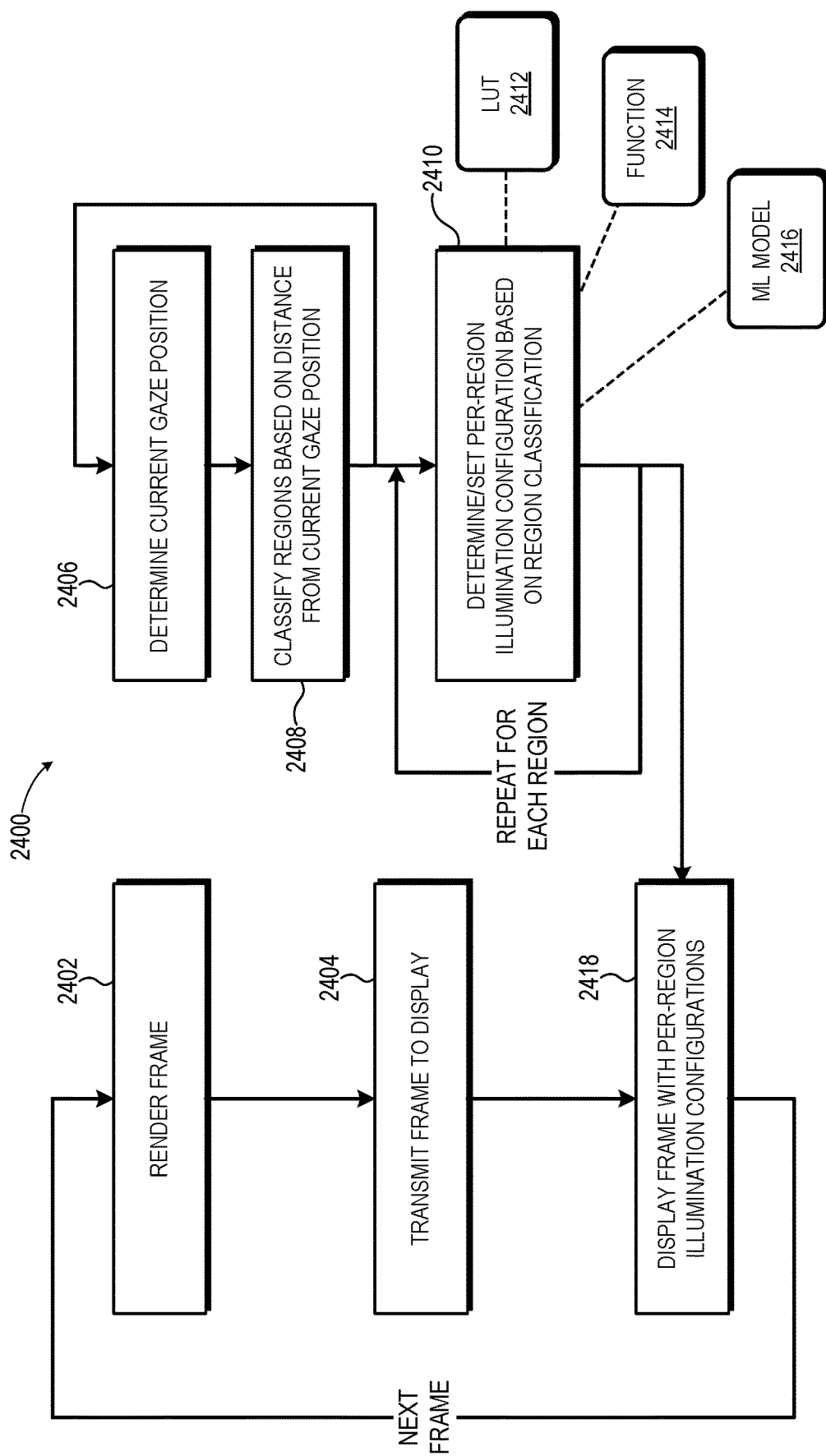
FIG. 24 is a flow diagram illustrating a method for foveated illumination control in accordance with some embodiments.
Figure 25:
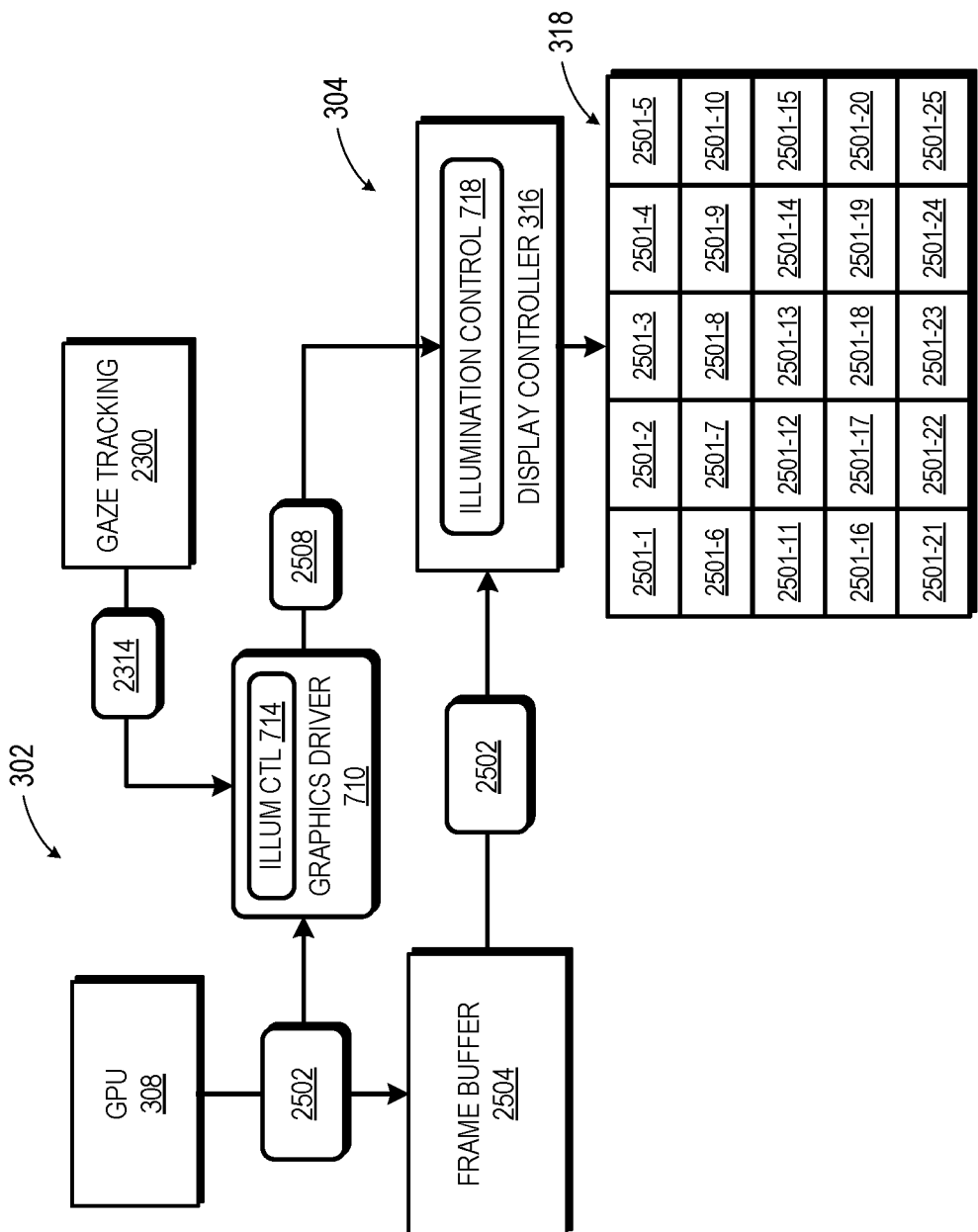
FIG. 25 is a diagram illustrating an example implementation for the method of FIG. 24 in accordance with some embodiments.

Turning now to FIG. 24, the method 2400 of FIG. 24 illustrates the general flow of the foveated regional illumination control technique 216 in accordance with some embodiments, and is described with reference to the example implementation represented in FIG. 25 in which the source-side illumination control module 714 (FIG. 7) is responsible for determining the illumination configuration settings to be implemented by the display device 304. However, the process described below can be adapted for implementation by the display-side illumination control module 718 using the guidelines provided herein.

At block 2402, the GPU 308 renders or otherwise generates a frame 2502 in a sequence of frames at the direction of the video content application 704 and buffers the generated frame in a frame buffer 2504 at the rendering device 302. At block 2404, the display driver 712 then transmits the buffered pixel data and metadata representative of the generated frame 2502 on a row-by-row basis, a column-by-column basis, a block-by-block basis, or some other pattern basis, to the display device 304 via the interconnect 305.

Concurrent with the frame generation and transmission processes of blocks 2402 and 2404, the illumination control module 714 of the graphics driver 710 initiates the process of determining an illumination configuration for each illumination region of the display matrix 318 based on the current gaze position 2312 and its relationship to the illumination regions region. In the example of FIG. 25, the display matrix 318 is configured as a grid-based regional partitioning, having a 5×5 arrangement of illumination regions 2501-1 to 2501-25. At block 2406, the gaze tracking subsystem 2300 determines the current gaze position 2312 and provides the corresponding gaze position representation 2314 to the illumination control module 714. At block 2408, the illumination control module 714 classifies each of the illumination regions 2501-1 to 2501-25 based on the location of the current gaze position 2312 represented by the gaze position representation 2314 relative to the illumination region at issue. In some embodiments, the illumination control module 714 implements a two tier approach in which each illumination region is classified as either a foveal region or a peripheral region based on distance of the region from the current gaze position 2312. In this case, the illumination region containing the current gaze position 2312 is designated as the foveal region and all of the remaining illumination regions are designated as peripheral regions. In other embodiments, more than two tiers of classification are implemented based on distance from the current gaze position 2312. For example, in one embodiment the illumination control module 714 implements a three tier approach in which the illumination region containing the current gaze position 2312 is classified as the foveal region, the illumination regions immediately adjacent to the foveal region are classified as intermediate regions, and the remaining illumination regions are classified as peripheral regions. Other classification schemes can be implemented using the guidelines provided herein.

At block 2410, the illumination control module 714 either determines an illumination configuration for a selected illumination region or modifies an illumination configuration previously identified for the selected illumination region based on the classification of the selected region. To illustrate, in some embodiments, the illumination control module 714 determines a default illumination configuration for the frame using one or a combination of the techniques described above, and then the illumination control module 714 modifies the default illumination configuration for each illumination region based on the classification of the region to generate a particular region-specific illumination configuration. In other embodiments, the classification of the region is used to select a particular illumination configuration from a set of predefined illumination configurations for use for that region.

In at least one embodiment, the relationship between the gaze-based classification for an illumination region and corresponding illumination configuration for the illumination region (or modification to a default illumination configuration on a per-region basis) are implemented using one or more LUTs 2412, one or more software functions 2414, or a learned model 2416 developed by an ML algorithm trained on previous use and previous user input on various settings. For example, a LUT 2412 has a plurality of entries indexed based on a corresponding gaze-based classification, with each corresponding entry storing a representation of a corresponding illumination configuration, including values for parameters such the particular front illumination fill level, back illumination fill level, strobe level, strobe position, strobe duration, and the like. As another example, a default frame-wide illumination configuration is specified, and each entry of the LUT 2412 includes an indication of a particular modification to the default illumination configuration, such as specifying an amount by which the strobe level is to be decreased from the default strobe level and an amount by which the fill level is to be increased form the default strobe level.

In the human visual system, a user's peripheral vision typically is more susceptible to noticing flicker than the user's foveal vision. Conversely, reduced acuity in a user's peripheral vision typically causes the user to be less susceptible to noticing motion blur in the peripheral vision, and more likely to notice motion blur in the foveal vision. Accordingly, in at least one embodiment, the relationship implemented by the illumination control module 714 to set or modify an illumination configuration for the illumination region generally provides for increased strobe emphasis and decreased fill emphasis for an illumination region classified as a foveated region, and conversely, for decreased strobe emphasis and increased fill emphasis for illumination regions classified as peripheral regions. Further, in embodiments in which an intermediate region classification is utilized, the relationship provides for a balance between strobe output and fill output for regions identified as such. Thus, for a scheme in which a frame-wide default or general illumination configuration is modified on a region-by-region basis, the illumination control module 714 can use the gaze-based classification for the illumination region to decrease the strobe output and increase a fill output from their default levels for an illumination region identified as a peripheral region, or conversely increase the strobe output and decrease a fill output from their default levels for a region identified the foveal region. Further, for an illumination region classified as an intermediate region, the general illumination configuration is employed without modification in this example.

The illumination control module 714 repeats the process of block 2410 for each illumination region of the display matrix 318 so as to determine a region-based illumination configuration (or region-based illumination configuration modification) for each illumination region, and transmits a representation 2508 of the illumination configuration, or illumination configuration modification, for each illumination region to the illumination control module 718 implemented at the display controller 316 of the display device 304. As similarly described above, the representation 2508 can include a data structure having an entry for each of illumination regions 2501-1 to 2501-25, with each entry storing values for the various parameters of the illumination configuration to be implemented for that illumination region. Alternatively, the data structure includes an entry representing a general illumination configuration, and each region-associated entry includes data indicating how the general illumination configuration is to be modified to create a regions-specific illumination configuration for that illumination region.

At block 2418, the display device 304 proceeds with display of the frame 2502 during its corresponding frame period. As part of this process, the illumination control module 718 controls, via the display controller 316, the illumination at each illumination region of the display matrix 318 during the frame period for the frame 2502 so as to implement the illumination configuration for that illumination region as specified in the per-region representation 2508. In other embodiments, the illumination control module 714 transmits one or more data structures with values representing the gaze-based classification for each illumination region, and it is the illumination control module 718 that determines or modifies an illumination configuration for each illumination region based on the received gaze-based classification for that region.

Figure 26:
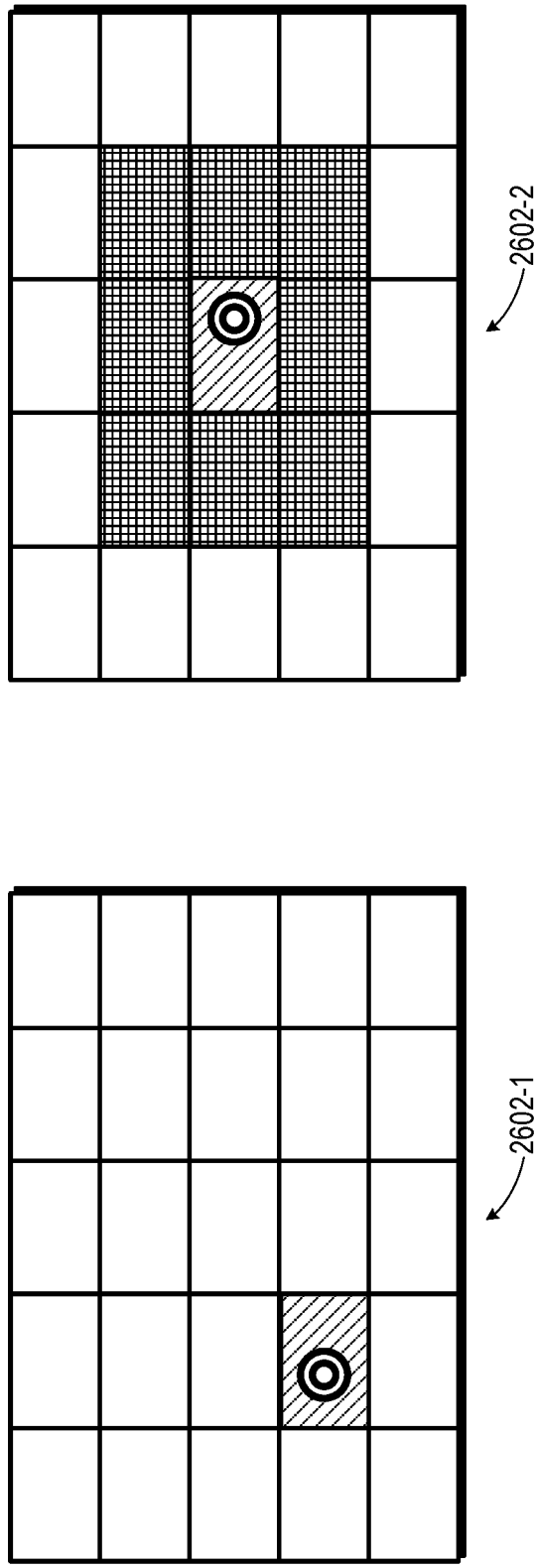
FIG. 26 is a diagram illustrating an example application of the method of FIG. 24 to two successive frames in accordance with some embodiments.

To illustrate an example of the method 2400, FIG. 26 depicts two different frames 2602-1 and 2602-2. Each of the frames 2602-1 and 2602-2 is partitioned into a 5×5 grid of frame regions, with each frame region corresponding to an independently-controlled illumination region 2501 of the display matrix 318. Frame 2602-1 illustrates the two-tier classification approach described above. In this example, the current gaze position (identified by icon 2604) is located in the area associated with illumination region 2501-17 (see FIG. 25), and thus illumination region 2501-17 is classified as the foveal region and the remaining illumination regions 2501-1 to 2501-16 and 2501-18-2501-25 are classified as peripheral regions. Accordingly, the region-specific illumination configuration employed by the display device 304 for the illumination region 2501-17 would be set or modified to emphasize use of an illumination strobe and deemphasize use of illumination fill, and while the other illumination regions would have region-specific illumination configurations that would be set or modified to deemphasize strobe use and emphasize fill use.

Frame 2602-2 illustrates the two-tier classification approach also described above. In this example, the current gaze position (identified by icon 2604) is located in the area associated with illumination region 2501-13 (see FIG. 25), and thus illumination region 2501-13 is classified as the foveal region. Illumination regions 2501-7, 2501-8, 2501-9, 2501-12, 2501-14, 2501-17, 2501-18, and 2501-19 are immediately adjacent to the illumination region 2501-13 and thus are classified as intermediate regions, and the remaining illumination regions are classified as peripheral regions. Accordingly, in this example, the region-specific illumination configuration employed by the display device 304 for the foveal region would be set or modified to emphasize use of an illumination strobe and deemphasize use of illumination fill, the region-specific illumination configurations for the peripheral regions would be set or modified to deemphasize strobe use and emphasize fill use, and the region-specific illumination configurations for the intermediate regions could, for example, default to a general frame-wide illumination configuration determined using one of the other illumination configuration control techniques described above.

In some embodiments, the apparatus and techniques described above are implemented in a system including one or more integrated circuit (IC) devices (also referred to as integrated circuit packages or microchips), such as one or more of the components of the display system 300 described above with reference to FIGS. 1-26. Electronic design automation (EDA) and computer aided design (CAD) software tools typically are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device are stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is, for example, embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are implemented in source code, assembly language code, object code, or other instruction format that is interpreted or otherwise executable by one or more processors.

Note that not all of the activities or elements described above in the general description are required, that a portion of a specific activity or device may not be required, and that one or more further activities can be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A computer-implemented method comprising:
    displaying a sequence of frames at display device using an illumination strobe during each frame period associated with a corresponding frame of the sequence of frames; and
    determining a position of the illumination strobe within each frame period based at least in part on one or more current operational parameters representing a current loading of a rendering device used to generate the sequence of frames.

2. The computer-implemented method of claim 1, wherein determining the position of the illumination strobe comprises determining a position of the illumination strobe so as to follow completion of a scan in and settling process for preparing a pixel matrix of the display device to display a frame and to precede a start of a next frame period.

3. The computer-implemented method of claim 1, further comprising:
    predicting a start of a next frame period based on at least one of a frame rate of the sequence of frames and an operational loading of the rendering device during generation of the sequence of frames.

4. The computer-implemented method of claim 1, further comprising predicting a start of a next frame based on a learned model trained by a machine learning algorithm based on a history of operational characteristics associated with at least one previous sequence of frames.

5. The computer-implemented method of claim 1, further comprising:
    determining at least one of an illumination level of the illumination strobe, an illumination level of an illumination fill preceding the illumination strobe, and an illumination level of an illumination fill following the illumination strobe based on a frame rate of the sequence of frames.

6. The computer-implemented method of claim 1, wherein determining the position of the illumination strobe is further based on one or more input parameters, the one or more input parameters including user input for modifying a setting for the position of the illumination strobe.

7. The computer-implemented method of claim 1, wherein determining the position of the illumination strobe is further based on one or more input parameters, the one or more input parameters including an identifier of a video content application that sourced the sequence of frames.

8. The computer-implemented method of claim 1, further comprising:
    determining a position of the illumination strobe within each frame period based on a presence of a delayed vertical sync between a frame rate of the rendering device and a refresh rate of the display device.

9. A display system, configured to:
    render, with a rendering device, a sequence of frames for display at a display device, wherein the display device is to use an illumination strobe during each frame period associated with a corresponding frame of the sequence of frames; and
    determine a position of the illumination strobe within each frame period based at least in part on one or more current operational parameters representing a current loading of the rendering device.

10. The display system of claim 9, wherein the display system is configured to determine the position of the illumination strobe by one of:
    setting the position of the illumination strobe so as to occur following completion of a scan in and settling process for preparing a pixel matrix of the display device to display a frame and to precede a start of a next frame period; and setting the position of the illumination strobe so as to occur following the start of the frame period and prior to completion of the scan in and settling process.

11. The display system of claim 9, wherein the display system further is configured to:

predict a start of a next frame period based on at least one of a frame rate of the sequence of frames and an operational loading of the rendering device during generation of the sequence of frames.

12. The display system of claim 9, wherein the display system is configured to predict a start of a next frame period based on a learned model trained by a machine learning algorithm based on a history of operational characteristics associated with at least one previous sequence of frames.

13. The display system of claim 9, wherein to determine the position of the illumination strobe within each frame period is further based on one or more input parameters, and wherein the one or more input parameters include a frame rate of the sequence of frames.

14. The display system of claim 9, wherein the display system further is configured to:

determine at least one of an illumination level of the illumination strobe, an illumination level of an illumination fill preceding the illumination strobe, and an illumination level of an illumination fill following the illumination strobe based on the frame rate.

15. The display system of claim 9, wherein to determine the position of the illumination strobe within each frame period is further based on one or more input parameters, and wherein the one or more input parameters include user input for modifying a setting for the position of the illumination strobe.

16. The display system of claim 9, wherein to determine the position of the illumination strobe within each frame period is further based on one or more input parameters, and wherein the one or more input parameters include an identifier of a video content application that sourced the sequence of frames.

17. The display system of claim 9, further comprising:

the display device, wherein the display device is configured to receive a representation of an illumination configuration for the frame period and implement the illumination configuration during the frame period, and wherein the representation of the illumination configuration includes a representation of the position of the illumination strobe.

18. The display system of claim 17, wherein the display device is a transmissive-type display device and the display device is configured to implement the illumination configuration via control of a backlight in accordance with the illumination configuration.

19. The display system of claim 17, wherein the display device is an emissive-type display device and the display device is configured to implement the illumination configuration by adjusting power provided to pixels of the display device in accordance with the illumination configuration.

20. A display system comprising:

a display device configured to:

receive a sequence of frames for display from a rendering device;

employ an illumination strobe during each frame period associated with a corresponding frame of the sequence of frames; and determine a position of the illumination strobe within each frame period based on one or more input parameters, each input parameter representing a corresponding operational characteristic of the rendering device, the corresponding operational characteristic representing a current loading of the rendering device.

* * * * *